(12) United States Patent
Watanabe et al.

(10) Patent No.: US 7,945,965 B2
(45) Date of Patent: May 17, 2011

(54) SENSOR FOR OBSERVATIONS IN LIQUID ENVIRONMENTS AND OBSERVATION APPARATUS FOR USE IN LIQUID ENVIRONMENTS

(75) Inventors: Naoya Watanabe, Chiba (JP);
Masatsugu Shigeno, Chiba (JP);
Masato Iyoki, Chiba (JP)

(73) Assignee: SII NanoTechnology Inc., Chiba (JP)

( * ) Notice: Subject to any disclaimer, the term of this patent is extended or adjusted under 35 U.S.C. 154(b) by 276 days.

(21) Appl. No.: 12/416,634

(22) Filed: Apr. 1, 2009

(65) Prior Publication Data
US 2009/0265819 A1  Oct. 22, 2009

(30) Foreign Application Priority Data

Apr. 16, 2008 (JP) .................................. 2008-106897

(51) Int. Cl.
*H01J 37/252* (2006.01)
(52) U.S. Cl. .......................................... 850/33; 73/105
(58) Field of Classification Search .................... 850/33; 73/105
See application file for complete search history.

(56) References Cited

U.S. PATENT DOCUMENTS 5,345,815 A     9/1994  Albrecht et al.
5,983,712 A  *  11/1999 Lindsay et al. ................. 73/105

* cited by examiner

*Primary Examiner* — Kiet T Nguyen
(74) *Attorney, Agent, or Firm* — Brinks Hofer Gilson & Lione

(57) ABSTRACT

The sensor has the self-detecting probe including a body portion, an elongated belt-like flexible substrate, connecting members, a resinous portion, and external contacts formed at the ends of the flexible substrate brought out of liquid. The probe further includes a cantilever whose base end is supported to the body portion, a strain resistive element whose resistance value varies according to the amount of displacement of the cantilever, and interconnects electrically connected with the strain resistive element. A probe tip is formed at the front end of the cantilever. The flexible substrate has an interconnect pattern sandwiched between two insulating sheets. The flexible substrate supports the body portion while the cantilever protrudes outwardly. At least one end of the flexible substrate is brought out of liquid. The connecting members connect the interconnects with the interconnect pattern. The interconnects, connecting members, and the portions of the connecting members electrically connected with the interconnect pattern are coated with the resinous portion.

10 Claims, 17 Drawing Sheets

SENSOR FOR OBSERVATIONS IN LIQUID ENVIRONMENTS AND OBSERVATION APPARATUS FOR USE IN LIQUID ENVIRONMENTS

RELATED APPLICATIONS

This application claims priority under 35 U.S.C. §119 to Japanese Patent Application No. JP2008-106897 filed on Apr. 16, 2008, the entire content of which is hereby incorporated by reference.

BACKGROUND OF THE INVENTION

1. Field of the Invention

The present invention relates to a sensor used for observations of the topography of sample surfaces and various physical properties (such as viscoelasticity) under liquid environments by making use of a self-detecting probe. The invention also relates to an observation apparatus for use in liquid environments.

2. Description of the Related Art

In recent years, with development of the nanotechnology, techniques for imaging and observing the surfaces of samples such as bio samples and semiconductor samples at high resolution have been required. One known apparatus for realizing this requirement is a scanning probe microscope (SPM). The scanning probe microscope is an instrument capable of imaging very tiny regions on the surfaces of various samples of metals, semiconductors, ceramics, resins, polymers, biomaterials, and insulators and of enabling observation of the surface topography of the sample and various physical properties such as viscoelasticity at atomic-level high resolution. In addition, the scanning probe microscope can be used under various environments such as in a vacuum, in a gas, within the atmosphere, and in liquids. Hence, scanning probe microscopes are adapted to be used in a wide range of applications.

Especially, in recent years, there is a very strong need for a technique enabling observation of samples under liquid environments because observation of the processes of electrochemical reactions of a sample in progress at the interface with an electrolytic solution or in vivo observation of a bio sample within a culture solution will be an important theme in forthcoming experiments or researches. Usually, when observation is made in liquids, an atomic force microscope (AFM) that is one type of scanning probe microscope is used. The atomic force microscope is used to observe the surface topography of a sample or its various physical properties by bringing a probe tip attached to the front end of a cantilever into contact with or close to the surface of the sample and performing scanning while controlling the distance between the probe tip and the sample such that the amount of flexure of the cantilever is kept constant.

In order to measure the amount of flexure of a cantilever, it is customary to use a so-called optical lever. In this method, the rear surface of the cantilever is illuminated with laser light. Laser light reflected from the rear surface is detected by a detector. The amount of flexure of the cantilever is measured based on a variation (variation in optical path) in the position at which the laser light is received. Therefore, it is necessary that the laser light be precisely directed at the rear surface of the cantilever. In addition, it is necessary to prealign the laser light path to assure that the reflected light enters the detector. That is, preparations for an observation are necessary. However, the prealignment is a very difficult work to perform because the optical path is aligned relative to the cantilever having a diameter of as small as tens of micrometers. Consequently, much labor and time are required. Especially, where observations are made under liquid environments, the cantilever is submerged in a liquid, making the work difficult.

Moreover, the cantilever is a consumable part. Therefore, it is necessary to replace it at appropriate times. When the cantilever is mounted in a normal manner, the worker picks up the body (about several millimeters in length) supporting the cantilever with tweezers and sets the body onto a cantilever holder. Unfortunately, this work itself is difficult for a novice to perform. For this reason, the present situation is that when the cantilever is mounted, the cantilever is damaged frequently. In addition, if the cantilever has been mounted successfully, the work for aligning the laser light path as described previously must be performed subsequently. Consequently, very cumbersome preparative steps must be carried out until an observation or measurement is started in practice.

In recent years, a self-detecting probe including a cantilever in which a strain resistive element (displacement sensor) such as a piezoelectric device is incorporated has been developed (see U.S. Pat. No. 5,345,815). The self-detecting probe is briefly described with reference to some drawings.

As shown in FIG. 20, a self-detecting probe, generally indicated by reference numeral 100, has a cantilever 101 and a body portion 101b. In addition, the probe 100 has a strain resistive element 102 whose resistance value varies with the amount of flexure of the cantilever 101 and a support base 103 supporting the body portion 101b. The cantilever 101 has a probe tip 101a at its front end. The base end of the cantilever 101 is supported to the body portion 101b.

The probe tip 101a, cantilever 101, and body portion 101b are integrally formed from a semiconductor material such as silicon. The strain resistive element 102 is located near the base end of the cantilever 101 and fabricated by ion implantation or other technique. Interconnects 104 are electrically connected with the strain resistive element 102 and extend from the cantilever 101 to over the body portion 101b. The interconnects 104 are electrically connected via connecting wires 105 with an interconnect pattern 106 formed on the support base 103. The ends of the interconnect pattern 106 form input/output terminals for sensor signals.

The self-detecting probe 100 constructed in this way makes it possible to monitor the resistance value of the strain resistive element 102 via the input/output terminals. The amount of flexure of the cantilever 101 can be precisely known based on the variation in the resistance value. Therefore, the self-detecting probe 100 dispenses with the use of the aforementioned optical lever.

In particular, the development of the self-detecting probe 100 can dispense with the work for aligning the laser light, which has been heretofore difficult to achieve. Consequently, many persons can enjoy the merit, and even novices can treat atomic force microscopes relatively easily. The emergence of the self-detecting probe 100 permits the consumable cantilever 101 to be replaced relatively easily in succession even in atomic force microscopes which are used in industrial applications and which enable automated measurements. In this way, the self-detecting probe 100 has contributed to development of the leading edge industry.

Although the above-described self-detecting probe 100 is easy to handle and considered to be a forthcoming mainstream technique, the probe tip is not adapted for use in observations under liquid environments.

First, when the self-detecting probe 100 that has been put into practical use and contributed to the development of the industry is used in practice, the probe is mounted on a substrate 110 made of a resin material such as glass epoxy to facilitate handling as shown in FIG. 21. A conductive pattern 112 electrically connected with the ends of the interconnect pattern 106 via wires 111 is formed on the substrate 110.

The substrate 110 needs to be set on a cantilever holder 120 shown in FIG. 22. The cantilever holder 120 consists chiefly of a holder body 122 to which a resilient electrode 121 is mounted and an electrode guide 124 firmly mounted to the holder body 122. The guide 124 supports the front end of the resilient electrode 121. A space into which the substrate 110 is inserted is created between a cantilever base 123 and the electrode guide 124.

When the substrate 110 is set in the cantilever holder 120 constructed in this way, the substrate 110 is inserted into the gap between the electrode guide 124 and the cantilever base 123 while orienting the conductive pattern 112 toward the resilient electrode 121. Because the substrate 110 is held down by the resilient electrode 121, the substrate 110 is held stationary. At the same time, the resilient electrode 121 makes contact with the conductive pattern 112, securing electrical connection. As a result, a flexure signal from the cantilever 101 can be picked up. The function of the atomic force microscope can be exhibited.

When observations are made within the atmosphere, no problems arise. However, when observations are made under liquid environments, it is inevitable that the self-detecting probe 100 itself is submerged in a liquid. Therefore, the interconnects 104, interconnecting wires 105, and interconnect pattern 106 are similarly submerged in the liquid. Consequently, electrical current leaks at the locations where they contact the liquid. In the worst case, electrical shorting takes place. Therefore, noise tends to enter the displacement signal. It has been impossible to precisely measure the displacement of the cantilever 101. Furthermore, electrochemical reactions induce corrosion at the locations where they contact the liquid. Hence, damage and breaks in conductors tend to occur. For these reasons, the self-detecting probe 100 is unsuitable for observations under liquid environments.

In addition, depending on the imaging mode, a piezoelectric device may be interposed between the cantilever holder and the self-detecting probe 100, and the cantilever 101 may be vibrated. In this case, however, the piezoelectric device itself also touches the liquid. Therefore, the piezoelectric device tends to suffer from similar problems.

SUMMARY OF THE INVENTION

The present invention has been made taking account of these circumstances. It is an object of the invention to provide a sensor permitting observations of a sample in a liquid by making use of a self-detecting probe without being affected by the liquid at all. It is another object of the invention to provide an observation apparatus having this sensor for use in observations under liquid environments.

To achieve these objects, the present invention provides the following means.

A sensor associated with the present invention and adapted for use in observations under liquid environments is used to observe a sample in a liquid by being set on a cantilever holder. The sensor has a body portion, a self-detecting probe, an elongated flexible substrate shaped like a belt, connecting members, a resinous portion made of an insulating resin, and external contacts. The self-detecting probe includes a cantilever, a strain resistive element, and interconnects electrically connected with the strain resistive element and extending from the cantilever to the body portion. A probe tip placed opposite to the sample when the sensor is set on the cantilever holder is formed at the front end of the cantilever. The base end of the cantilever is supported to the body portion. The strain resistive element is formed on the cantilever and has a resistance value that varies according to the amount of displacement of the cantilever. The flexible substrate has two insulating sheets bonded or sealed to each other with an interconnect pattern formed therebetween. The flexible substrate supports the body portion while the cantilever protrudes outwardly. At least one end of the flexible substrate is brought out of the liquid. The connecting members electrically connect the interconnects with the interconnect pattern. The interconnects, the connecting members, and the portions of the connecting members electrically connected with the interconnect pattern are coated with the resinous portion. At the external contacts, the interconnect pattern is exposed to the outside at the ends of the flexible substrate brought out of the liquid.

In the sensor associated with the invention and adapted for observations under liquid environments, when the sensor is set on the cantilever holder, the probe tip formed at the front end of the cantilever is placed opposite to the sample placed under liquid environments. At this time, the strain resistive element formed on the cantilever is electrically connected with the interconnect pattern on the flexible substrate via the interconnects and connecting members. Therefore, electrical current can be supplied into the strain resistive element via the external contacts on the interconnect pattern, and the resistance value of the strain resistive element can be monitored. Although the cantilever is displaced by the interatomic force acting between the probe tip and the sample, the amount of displacement of the cantilever can be detected by monitoring the resistance value. As a result, the sample can be imaged and observed.

Because the sample is under the liquid environment, the surroundings of the self-detecting probe are also under the liquid environment and contacts the liquid. However, the interconnects extending from the cantilever to over the body portion, the connecting members connecting the interconnects with the interconnect pattern, and the portions of the connecting members electrically connected with the interconnect pattern are coated with the resinous portion made of insulating resin and thus are reliably waterproofed. Therefore, even in liquid environments, electrical leakage or shorting does not take place, unlike in the prior art. Additionally, damage and conductor breakage due to corrosion are prevented. The external contacts of the interconnect pattern are formed at ends of the elongated flexible substrate brought out of the liquid and so the possibility that the external contacts touch the liquid is eliminated. Moreover, the interconnect pattern extending from the points at which the connecting members are connected to the external contacts is sandwiched between the two insulating sheets and covered. Accordingly, reliable waterproofness is achieved. There is no danger of touching the liquid.

In this way, the sensor for observations in liquid environments is totally waterproofed. The sample can be observed in liquid stably over a long time by making use of the self-detecting probe without being affected by the liquid at all. When the sensor for observations in liquids is set or replaced, anyone can easily replace the sensor without wetting the external contacts because they are brought out of the liquid. Consequently, the sensor is easy for the user to handle and offers excellent convenience.

In one feature of the above-described sensor associated with the present invention and adapted for use in observations under liquid environments, the self-detecting probe is supported such that the body portion is sandwiched between the two insulating sheets.

In the sensor associated with the present invention and adapted for use in observations under liquid environments, the body portion of the self-detecting probe is held between the two insulating sheets of the flexible substrate and covered. Consequently, parts of the interconnects, connecting members, and the portions of the connecting members electrically connected with the interconnect pattern are protected by the insulating sheets. This assures reliable waterproofness. Consequently, the sensor is less affected by the liquid.

In another feature of the above-described sensor associated with the present invention and adapted for use in observations under liquid environments, the flexible substrate is provided with holes extending through it. The self-detecting probe is supported such that the cantilever protrudes into spaces formed by the holes. When the flexible substrate is not curved but flat, the cantilever is nested within the thickness of the substrate. When the flexible substrate is curved, the cantilever protrudes from the surface of the substrate.

In the sensor associated with the present invention and adapted for use in observations under liquid environments, when the sensor is set on the cantilever holder, the flexible substrate is slightly curved. Consequently, the cantilever protruding into the spaces formed by the holes protrudes from the surface of the flexible substrate. As a result, the probe tip formed at the front end of the cantilever is placed opposite to the sample. This enables observations in liquids.

On the other hand, when the sensor is not set on the cantilever holder, the flexible substrate is flat. Therefore, the cantilever is nested within the thickness of the flexible substrate. Because the cantilever does not protrude from the surface of the flexible substrate, the cantilever can be protected. The possibility that the cantilever is damaged can be reduced. Hence, the quality of the sensor for observations under liquid environments can be enhanced. Especially, the probe tip formed at the front end of the cantilever can be protected.

In a further feature of the above-described sensor associated with the present invention and adapted for use in observations under liquid environments, the aforementioned holes extending through the flexible substrate are plural in number. The holes are regularly spaced from each other longitudinally of the substrate. The self-detecting probe is mounted in each of the holes.

In the sensor associated with the present invention and adapted for use in observations under liquid environments, the plural self-detecting probes are supported longitudinally of the flexible substrate. The self-detecting probes can be easily replaced in a short time simply by shifting the flexible substrate in the longitudinal direction. Accordingly, the labor in replacing the probe can be reduced to a minimum. Observations under liquid environments can be performed efficiently.

In a yet other feature of the above-described sensor associated with the present invention and adapted for use in observations under liquid environments, a vibration source for vibrating the cantilever with given phase and amplitude is mounted between the insulating sheets and the body portion while electrically connected with the interconnect pattern.

In the sensor associated with the present invention and adapted for use in observations under liquid environments, there is provided the vibration source and, therefore, observations can be made under liquid environments in a vibrational mode where the cantilever is vibrated. Therefore, the sample can be observed from more directions based on various kinds of data.

Especially, the body portion can be brought into direct contact with the vibration source and, therefore, vibrations of the vibration source can be directly transmitted to the body portion such that vibrations of the other components are minimized. Consequently, only the cantilever can be vibrated in a desired state. The accuracy of observations under liquid environments can be enhanced. Furthermore, the vibration source is protected by the insulating sheets of the flexible substrate and so the vibration source is waterproofed. Thus, the vibration source is not affected by the liquid at all.

An observation apparatus associated with the present invention and adapted for observations under liquid environments has the above-described inventive sensor for observations under liquid environments, a cantilever holder, a moving mechanism for scanning the probe tip and sample relative to each other in a direction parallel to the surface of the sample and for moving the probe tip and sample relative to each other in a direction perpendicular to the surface of the sample, a detection mechanism for detecting the value of an electrical current flowing through the interconnects via the external contacts and for detecting the amount of deflection of the cantilever, and an observation mechanism for observing the sample by controlling the distance between the probe tip and the surface of the sample during scanning by controlling the moving mechanism such that the amount of displacement or amount of amplitude of the cantilever is kept constant. The cantilever holder has a fixing mechanism for detachably fixing the sensor. When the sensor is set, the cantilever holder places the probe tip opposite to the sample.

In this observation apparatus used under liquid environments, the sensor for observation under liquid environments is set on the cantilever holder by the fixing mechanism. Consequently, the probe tip is placed opposite to the sample under liquid environments. Electrical current is supplied into the interconnects via the external contacts. The value of the current is monitored by the detection mechanism. Under this condition, scanning is done by the moving mechanism. During the scanning, an interaction acts between the probe tip and sample due to the interatomic force. Therefore, the cantilever is displaced according to the topography of the surface of the sample. The strain resistive element is also displaced in response to the displacement of the cantilever, resulting in a variation in the resistance value. As a consequence, the detection mechanism can detect the amount of displacement of the cantilever based on the monitored value of electrical current. The observation mechanism controllably scans the moving mechanism to control the distance between the probe tip and the surface of the sample during the scanning such that the amount of displacement or amount of amplitude is kept constant. Consequently, the observation mechanism can derive information about the topography of the surface of the sample in liquid and information about various kinds of physical properties. Thus, observations under liquid environments can be achieved.

Especially, observations under liquid environments can be made by employing self-detecting probes. An alignment work performed as a preparative step prior to observation and consisting of illuminating the rear surface of the cantilever with laser light is dispensed with. Accordingly, the apparatus is very easy to use. The operability can be improved. In addition, observations in liquids can be made quickly.

In one feature of the above-described observation apparatus associated with the present invention and adapted for observations under liquid environments, the fixing mechanism has wires extending in a widthwise direction substantially perpendicular to the longitudinal direction of the flexible substrate. The sensor for observations under liquid environments is held down on the cantilever holder and made stationary using the wires. The wires are loosened to release the sensor. The flexible substrate is provided with notches at opposite sides. The wires enter the notches to place the wires in position.

In the observation apparatus associated with the present invention and adapted for observations under liquid environments, the sensor for observations under liquid environments can be set on the cantilever holder by a simple method using wires. In particular, when the wires have been loosened, the sensor for observations under liquid environments is placed on the cantilever holder. Then, the wires are stretched. Consequently, the sensor is pressed down on the cantilever holder and thus can be held with certainty. Furthermore, the wires enter the notches formed on the opposite sides of the flexible substrate. Therefore, the wires are placed in position at the same positions every time. Accordingly, the sensor for observations under liquid environments can be held with certainty at a predetermined position. Hence, accurate observations under liquid environments can be made.

In another feature of the above-described observation apparatus associated with the present invention and adapted for observations under liquid environments, the flexible substrate is provided with guide holes extending through the substrate. The fixing mechanism has fixing pins of one pair that can be moved toward and away from each other. The fixing pins are inserted into the guide holes. A tensile force can be applied across the flexible substrate by moving the fixing pins of one pair away from each other. Thus, the sensor for observations under liquid environments is held.

In the observation apparatus associated with the present invention and adapted for observations under liquid environments, the sensor for observations under liquid environments can be set on the cantilever holder by a simple method using a pair of fixing pins. In particular, after the fixing pins of one pair are brought close to each other, the sensor for observations under liquid environments is placed on the cantilever holder while the fixing pins are inserted into the guide holes formed in the flexible substrate. Then, the fixing pins of one pair are moved away from each other. Consequently, the flexible substrate is stretched within a plane. As a result, the substrate is held with certainty by the fixing pins of one pair.

Furthermore, the sensor for observations under liquid environments can be reliably held in a predetermined position because the fixing pins are inserted into the guide holes. In consequence, accurate observations in liquids can be made.

In one feature of the above-described observation apparatus associated with the present invention and adapted for observations in liquid environments, the guide holes are formed at ends of the flexible substrate and extend through the external contacts. The detection mechanism and external contacts are automatically electrically interconnected by inserting the fixing pins into the guide holes.

In the observation apparatus associated with the invention and adapted for observations under liquid environments, the guide holes into which the fixing pins of one pair are inserted are formed at the ends of the flexible substrate and extend through the external contacts. Therefore, the detection mechanism and external contacts are automatically electrically interconnected at the instant when the fixing pins are inserted into the guide holes. That is, the work for electrically interconnecting the detection mechanism and external contacts can be automated by performing a work for setting the sensor for observations in liquid environments onto the cantilever holder. Accordingly, preparations for observations can be made more quickly. The operability can be improved further.

In another feature of the above-described observation apparatus associated with the invention and adapted for observations under liquid environments, the fixing mechanism has suction passages in communication with openings formed in the cantilever holder. The sensor for observations under liquid environments can be attracted and held via the suction passages.

In the observation apparatus associated with the invention and adapted for observations under liquid environments, suction is performed via the suction passages after the sensor for observations under liquid environments is placed on the cantilever holder. Consequently, the sensor can be attracted and held on the cantilever holder. In this way, the sensor for observations under liquid environments can be set on the cantilever holder by a simple method utilizing an attractive force.

The inventive sensor for observations in liquid environments makes it possible to make observations of a sample in a liquid by making use of a self-detecting probe without being affected by the liquid at all.

The inventive observation apparatus adapted for observations in liquid environments makes it possible to make observations in a liquid by making use of a self-detecting probe and, therefore, an alignment work consisting of illuminating the rear surface of a cantilever with laser light as a preparatory step prior to observations is dispensed with. Consequently, the apparatus is quite easy to use. The operability can be enhanced. Furthermore, observations in liquids can be made quickly.

Especially, the inventive observation apparatus used for observations under liquid environments can be used in biomedical applications. It can be anticipated that the inventive observation apparatus will contribute greatly to the development of the molecular cell biology that has been researched intensively in recent years.

DETAILED DESCRIPTION OF THE PREFERRED EMBODIMENTS

First Embodiment

Figure 1:
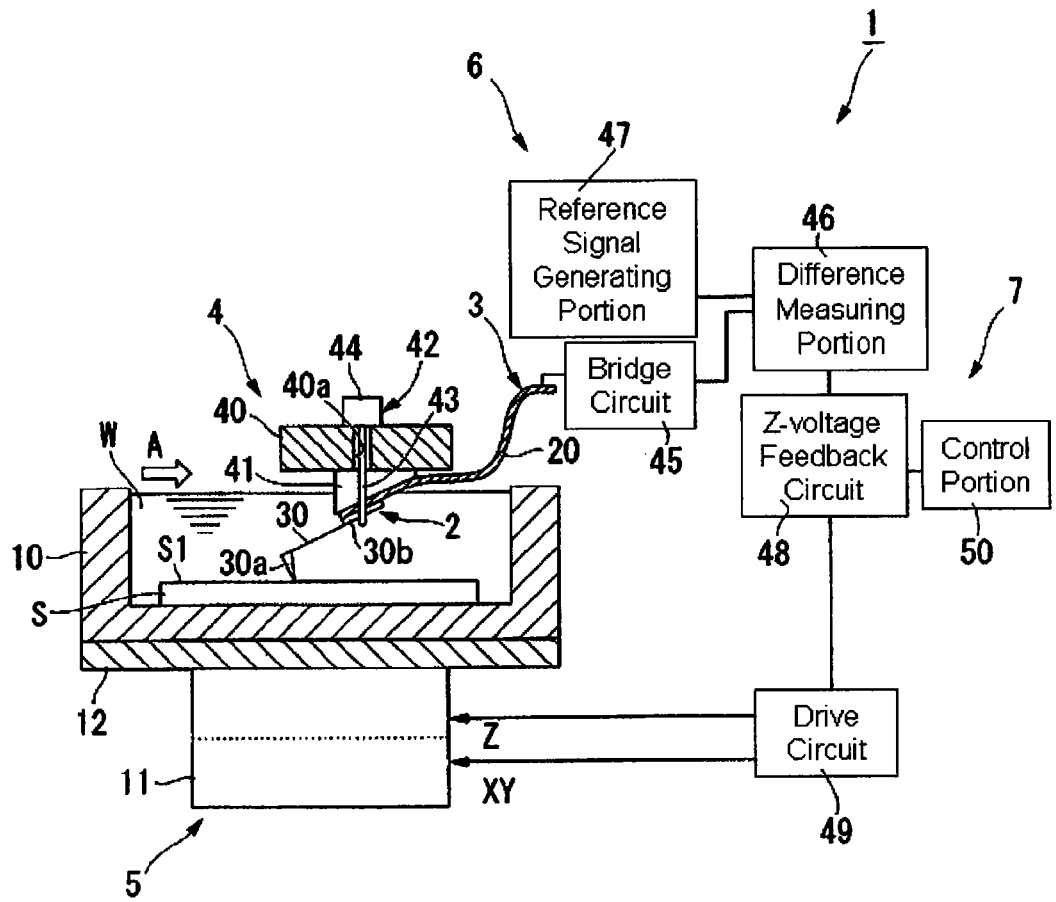
FIG. 1 is a block diagram of an observation apparatus showing a first embodiment associated with the present invention, the apparatus being adapted for use under liquid environment.
Figure 1:
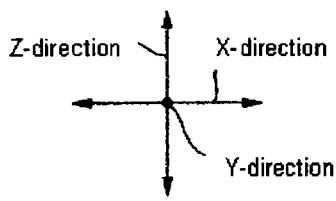

A first embodiment associated with the present invention is hereinafter described with reference to FIGS. 1-5. In the present embodiment, an example is given in which measurements are made after a sample S has been entered in a liquid vessel 10 where a liquid W is stored. An observation apparatus 1 of the present embodiment is used to observe the sample S in the liquid by measuring the topography of the surface of the sample S within the liquid W or various physical properties such as viscoelasticity. As shown in FIG. 1, the apparatus 1 has a sensor 3 for observations under liquid environments, a cantilever holder 4, a moving mechanism 5, a detection mechanism 6, and an observation mechanism 7. The sensor 3 has a self-detecting probe 2.

First, the sample S is held to the bottom surface of the liquid vessel 10 to prevent the sample from moving. The vessel 10 has an open top portion of U-shaped cross section. The vessel 10 is held on a sample stage 12, which in turn is fixed on an XYZ stage 11.

When the sensor 3 for observations under liquid environments is set on the cantilever holder 4, the sample S submerged within the liquid W (in the liquid environment) can be observed. The sensor 3 includes a flexible substrate 20, as well as the self-detecting probe 2 described previously.

Figure 2:
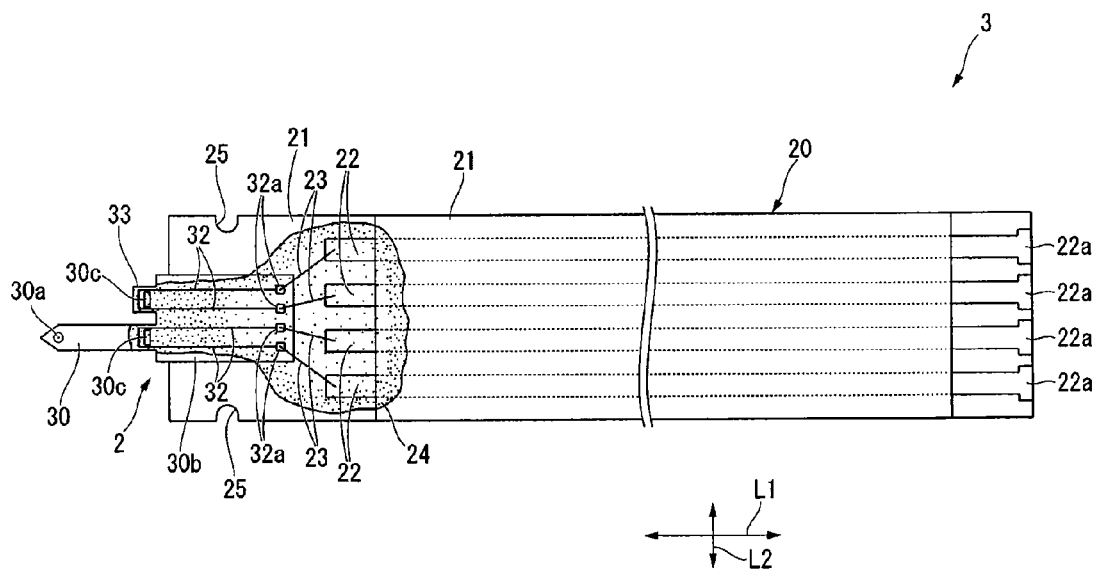
FIG. 2 is a top plan view of the sensor shown in FIG. 1, the sensor being adapted for observations under liquid environments.
Figure 3:
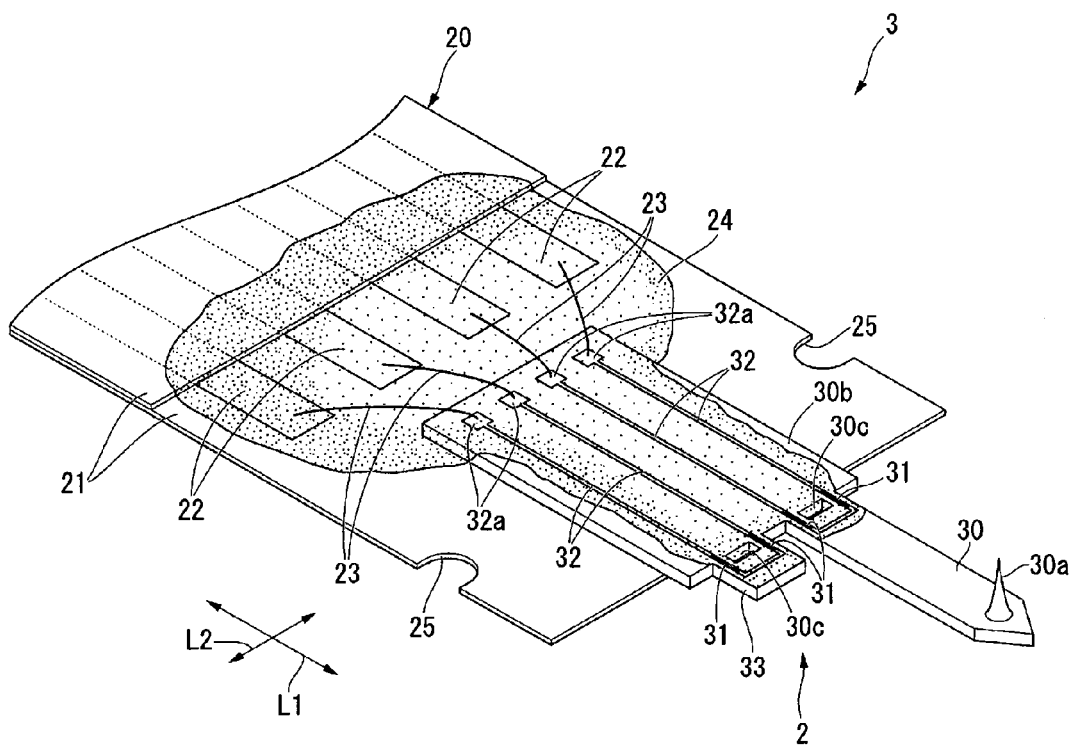
FIG. 3 is an enlarged perspective view of a self-detecting probe constituting the sensor shown in FIG. 2, the sensor being used for observations under liquid environments.
Figure 4:
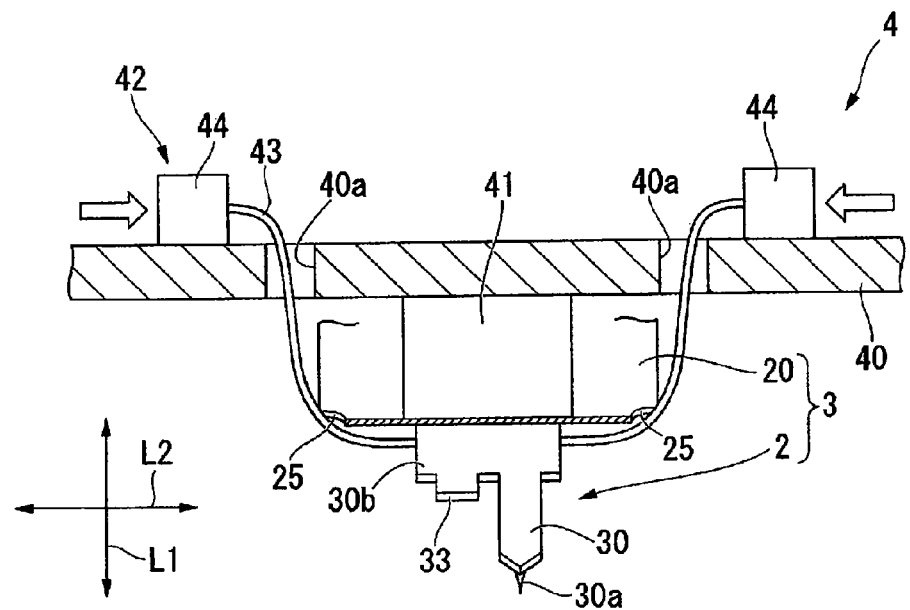
FIGS. 4(a) and (b) shows side elevations of the cantilever holder and sensor shown in FIG. 1 adapted for observations under liquid environments, as viewed from the direction of the arrow A.
Figure 4:
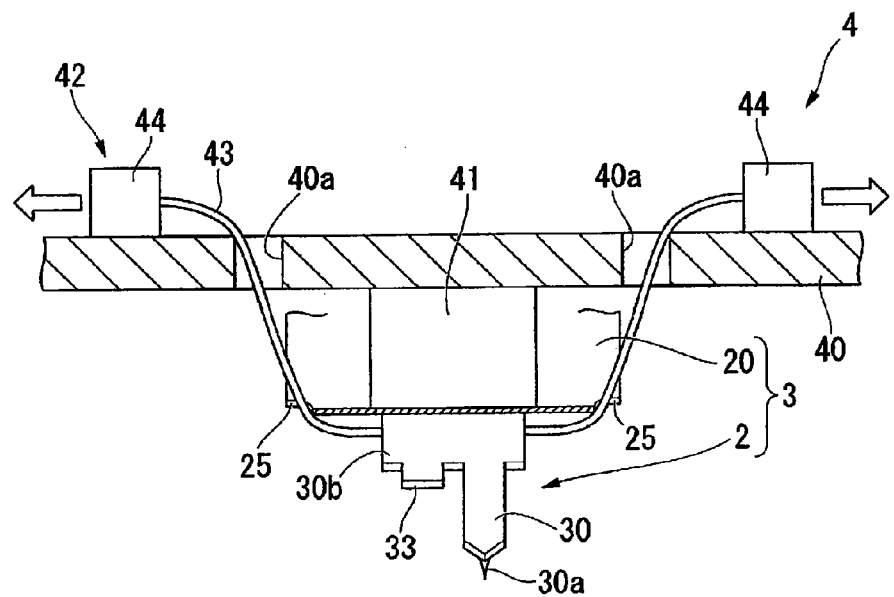

As shown in FIGS. 2 and 3, the self-detecting probe 2 has a body portion 30b, a cantilever 30, a strain resistive element 31 such as a piezoresistive element whose resistance value varies according to the amount of displacement of the cantilever 30, and interconnects 32 extending from the cantilever 30 to over the body portion 30b. The interconnects 32 are electrically connected with the strain resistive element 31. A probe tip 30a is formed at the front end of the cantilever 30. The cantilever 30 has a base end supported to the body portion 30b. When the probe 2 is set on the cantilever holder 4, the probe tip 30a is placed opposite to the sample S.

The self-detecting probe 2 is integrally fabricated from a semiconductor material such as silicon. An openings 30c is formed near the base end of the cantilever 30 that is the junction between the cantilever 30 and the body portion 30b. The cantilever 30 is more pliable at the base end. The number of the opening 30c is not limited to one. Any arbitrary number of openings may be formed. Furthermore, the opening 30c may be dispensed with.

The strain resistive element 31 has portions located on the opposite sides of the opening 30c at the base end of the cantilever 30. The strain resistive element 31 is formed by implanting a dopant, for example, by ion implantation or diffusion method. The interconnects 32 are made of a metal such as aluminum. The interconnects 32 are shaped like the letter U in areas extending from the cantilever 30 to the body portion 30b. The interconnects 32 are electrically connected with the strain resistive element 31. Connector terminals 32a are mounted at the ends of the interconnects 32 located at one end of the body portion 30b.

In the self-detecting probe 2 of the present embodiment, a reference lever 33 used as a reference is cantilevered and supported to the body portion 30b adjacently to the cantilever 30. The reference lever 33 is designed to be shorter than the cantilever 30. An opening 30c is formed on the base end side in the same way as in the cantilever 30. A strain resistive element 31 and interconnects 32 are formed. The reference lever 33 is used to provide temperature compensation of the strain resistive element 31. Note that the reference lever 33 is not essential to the self-detecting probe 2.

The flexible substrate 20 is made up of two insulating sheets 21 bonded together and an interconnect pattern 22 formed between the insulating sheets 21. The substrate 20 is shaped like an elongated belt. The insulating sheets 21 are made of film, for example, of polyimide. The interconnect pattern 22 is fabricated by patterning a thin film of copper.

The self-detecting probe 2 is supported to one end of the flexible substrate 20. In particular, the body portion 30b is adhesively bonded to one insulating sheet 21 while the cantilever 30 protrudes out of the flexible substrate 20. The interconnect pattern 22 extends close to the self-detecting probe 2 while parts of the pattern are exposed.

Connecting wires 23 forming connecting members are wire-bonded between the connector terminals 32a of the interconnects 32 and the interconnect pattern 22. The connector terminals 32a and interconnect pattern 22 are electrically interconnected via the connecting wires 23. The interconnects 32, connecting wires 23, and the portions of the wires 23 electrically connected with the interconnect pattern 22 are coated with a resinous portion 24 made of an insulating resin. As a result, all the circuit portions through which electrical current flows are waterproofed.

As shown in FIG. 1, the flexible substrate 20 is so elongated that the other end is brought out of the liquid W stored in the liquid vessel 10. As shown in FIG. 2, the interconnect pattern 22 has externally exposed portions at the other end brought out of the liquid, thus forming external contacts 22a. The external contacts 22a are omitted in FIG. 1.

Substantially semicircular notches 25 are formed on the opposite sides of one end of the flexible substrate 20 of the present embodiment. The notches 25 are located on the opposite sides of the self-detecting probe 2. Wires 43 (described later) enter the notches 25 to place the wires 43 in position.

As shown in FIGS. 1 and 4(a) and (b), the cantilever holder 4 has a holder body 40, an obliquely faced block 41 fixed to the bottom surface of the holder body 40, and a fixing mechanism 42 for detachably fixing the sensor 3 for observations under liquid environments. FIGS. 4(a) and (b) shows views of the cantilever holder 4 and self-detecting probe 2, as viewed from the direction of the arrow A in FIG. 1. The openings 30c are omitted in FIGS. 4(a) and (b).

The fixing mechanism 42 has a pair of wire fixing portions 44 in addition to the wires 43 extending in a widthwise direction L2 substantially perpendicular to the longitudinal direction L1 of the flexible substrate 20.

The wire fixing portions 44 of one pair are movably held to the top surface of the holder body 40 such that the wire fixing portions 44 can be moved toward and away from each other in the widthwise direction L2 of the flexible substrate 20. The wires 43 have a given tensile strength and are stretched across the obliquely faced block 41. The opposite ends of the wires 43 pass through through-holes 40a formed in the holder body 40 and are connected with the wire fixing portions 44 of one pair. The tension in the wires 43 can be adjusted at will by moving the pair of wire fixing portions 44.

That is, the sensor 3 for observations under liquid environments can be held down and fixed by the wires 43 by moving the wire fixing portions 44 of one pair away from each other after bringing the sensor 3 into contact with the obliquely faced block 41. At this time, the wires 43 enter the notches 25 formed in the flexible substrate 20, whereby the wires are placed in position.

Furthermore, the wires 43 can be loosened and the sensor 3 can be released by moving the wire fixing portions 44 of one pair toward each other. In this way, the fixing mechanism 42 of the present embodiment can mount and dismount the sensor 3 for observations under liquid environments by making use of the wires 43.

When the sensor 3 for observations under liquid environments is set on the cantilever holder 4, the cantilever 30 is tilted by a given angle with respect to the surface S1 of the sample by the tilt of the obliquely faced block 41 as shown in FIG. 1.

Figure 5:
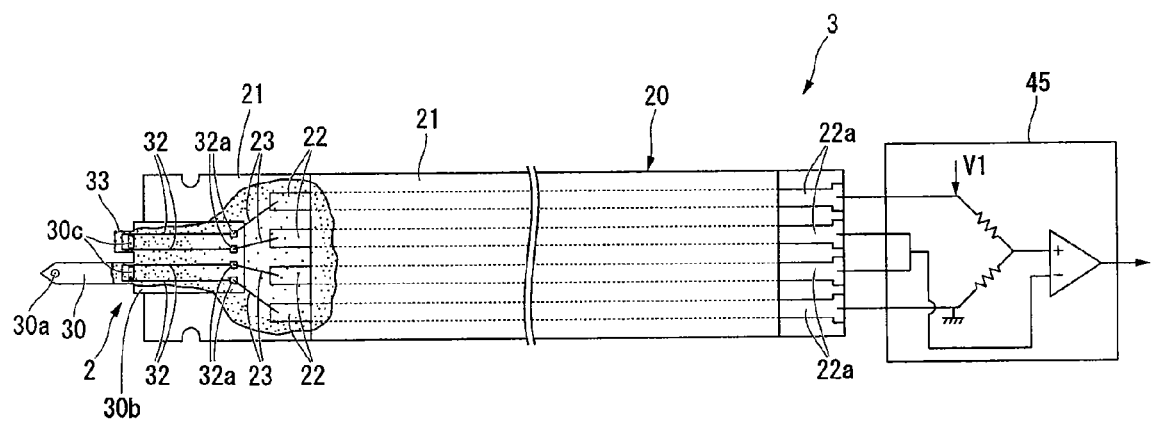
FIG. 5 is a view showing the relationship between the sensor shown in FIG. 2 adapted for observations under liquid environments and a bridge circuit.

When the sensor 3 for observations under liquid environments is set on the cantilever holder 4, the external contacts 22a of the flexible substrate 20 brought out of the liquid W are connected with a bridge circuit 45 as shown in FIG. 1. The bridge circuit 45 detects the value of electrical current flowing through the interconnects 32 electrically connected with the strain resistive element 31 via the interconnect pattern 22 and connecting wires 23 as shown in FIG. 5. After amplifying its output signal corresponding to the detected value of electrical current, the bridge circuit 45 outputs the output signal to a difference measuring portion 46 as shown in FIG. 1.

The resistance value of the strain resistive element 31 varies according to the displacement of the cantilever 30. The resistance value is affected also by temperature variations. However, the bridge circuit 45 of the present embodiment refers to the strain resistive element 31 on the side of the reference lever 33 and therefore can cancel out the undesired variation in resistance value due to temperature variation. Hence, the effects of the temperature can be eliminated.

Therefore, the bridge circuit 45 outputs an output signal corresponding to only the variation in the current value caused by the displacement of the cantilever 30.

The output signal from the bridge circuit 45 is applied to the difference measuring portion 46. As shown in FIG. 1, a reference signal from a reference signal generating portion 47 is also applied to the difference measuring portion 46. The reference signal makes the output from the difference measuring portion 46 null, for example, when the amount of displacement of the cantilever 30 is 0. The difference measuring portion 46 compares the output signal sent in from the bridge circuit 45 with the reference signal and outputs an error signal equal to the difference to a Z voltage feedback circuit 48. That is, the error signal corresponds to the amount of displacement of the cantilever 30. Therefore, the amount of displacement of the cantilever 30 can be detected by monitoring the error signal. That is, the bridge circuit 45, difference measuring portion 46, and reference signal generating portion 47 together act as the above-described detection mechanism 6 for detecting the amount of displacement of the cantilever 30 by detecting the value of electrical current flowing through the interconnects 32.

The XYZ stage 11 is a piezoelectric device made, for example, of PZT. When a voltage is applied from a drive circuit 49, the stage moves a quite small distance in three directions consisting of the X and Y directions parallel to the surface S1 of the sample and the Z direction perpendicular to the surface S1 in response to the amount of the applied voltage and its polarity. In consequence, the self-detecting probe 2 and sample stage 12 can be moved relative to each other in the three directions (i.e., X, Y, and Z directions). That is, the XYZ stage 11 and drive circuit 49 together act as the above-described moving mechanism 5.

The Z voltage feedback circuit 48 provides feedback control of the drive circuit 49 such that the error signal sent in is kept constant. As a consequence, the self-detecting probe 2 can be scanned while controlling the distance between the probe tip 30a and the surface S1 of the sample in the heightwise direction such that the amount of displacement of the cantilever 30 is kept constant. A control portion 50 made of a personal computer or the like is connected with the Z voltage feedback circuit 48. The control portion 50 measures the topography of the surface of the sample S and various physical properties based on a signal varied by the Z voltage feedback circuit 48.

That is, the Z voltage feedback circuit 48 and control portion 50 together act as the above-described observation mechanism 7 for controlling the moving mechanism 5 to maintain constant the detected amount of displacement of the cantilever 30 to observe the sample S.

A case in which the sample S is observed under liquid environments using the observation apparatus 1 constructed as described above is next described.

First, the sample S is held on the bottom surface of the liquid vessel 10 in which the liquid W is stored. Then, the vessel 10 is placed on the sample stage 12. The sensor 3 for observations under liquid environments is set on the cantilever holder 4. That is, as shown in FIG. 4(a), the wire fixing portions 44 of one pair are moved toward each other to loosen the wires 43. Under this condition, the sensor 3 is brought into contact with the obliquely faced block 41. As shown in FIG. 4(b), a tensile force is applied across the wires 43 by moving the wire fixing portions 44 of one pair away from each other. Consequently, the sensor 3 can be pressed against the obliquely faced block 41 by the wires 43. The sensor 3 can be held easily. Especially, the wires 43 enter the notches 25 formed in the flexible substrate 20 and so the wires 43 are placed in position accurately. Accordingly, the sensor 3 can be held at a predetermined position reliably. Hence, subsequent observations under liquid environments can be carried out precisely.

When the sensor 3 for observations under liquid environments is set on the cantilever holder 4, the probe tip 30a is placed opposite to the sample S in the liquid environment as shown in FIG. 1. The self-detecting probe 2 is similarly submerged in the liquid W and placed in the liquid environment.

On the other hand, the other end of the flexible substrate 20 is remote from the observed region and brought out of the liquid W. As shown in FIG. 5, the external contacts 22a formed at the other end are connected with the bridge circuit 45. Then, a given voltage V1 is applied to the interconnects 32 via the bridge circuit 45 as shown in FIG. 5, and the value of the electrical current is monitored.

After completing these preparative steps, an observation under liquid environments is started.

First, an initial setup operation is performed. That is, the probe tip 30a is brought into contact with or close to the surface S1 of the sample. For this purpose, the XYX stage 11 is slowly elevated in the Z direction. The probe tip 30a begins to approach the sample surface S1 slowly. The interatomic force acting between them deflects and displaces the cantilever 30. In response to this, the strain resistive element 31 is similarly displaced. This varies the resistance value, changing the current value. The control portion 50 once halts the operation of the XYZ stage 11 based on the result of detection made by the detection mechanism 6 at the instant when the amount of flexure of the cantilever 30 has reached a predetermined amount of flexure. Consequently, the probe tip 30a can be kept in contact with or close to the sample surface S1. Under this condition, the cantilever 30 is unflexed and is in its initial state. Using this condition as a reference, the reference signal generating portion 47 produces a reference signal.

After the completion of this initial setup operation, the XYZ stage 11 moves the sample stage 12 in the X and Y directions to perform scanning, for starting a measurement. The probe tip 30a undergoes an interatomic force exerted between the probe tip and the sample S. Therefore, during the scanning, the cantilever 30 is deflected and displaced according to the topography of the sample surface S1. In response to the displacement of the cantilever 30, the strain resistive element 31 is also displaced, varying the resistance value. Therefore, the current value detected by the bridge circuit 45 changes. The bridge circuit 45 outputs an output signal corresponding to the current variation to the difference measuring portion 46.

The difference measuring portion 46 compares the incoming output signal with the reference signal sent in from the reference signal generating portion 47 and calculates an error signal corresponding to the amount of displacement of the cantilever 30. The error signal is outputted to the Z voltage feedback circuit 48. Consequently, the Z voltage feedback circuit 48 can detect the amount of displacement of the cantilever 30. The feedback circuit 48 controls the drive circuit 49 to move the sample stage 12 in the Z direction based on the error signal such that the distance between the probe tip 30a and the sample surface S1 is kept constant. That is, the feedback circuit controls the sample stage 12 such that the error signal approaches 0.

As a result, during scanning of the self-detecting probe 2, the XYZ stage 11 can be scanned while controlling the height in the Z direction appropriately such that the detected amount of displacement of the cantilever 30 is kept constant. The control portion 50 can measure the topography of the surface of the sample S and data about various physical properties based on the signal varied by the Z voltage feedback circuit 48. Consequently, the sample S can be observed under the liquid environment.

At the instant when the sensor 3 for observations under liquid environments is set on the cantilever holder 4, the self-detecting probe 2 is placed in the liquid environment in the same way as the sample S and touches the liquid W. However, the interconnects 32 extending from the cantilever 30 to over the body portion 30b, connecting wires 23 connecting the interconnects 32 with the interconnect pattern 22, and the portions of the connecting wires 23 electrically connected with the interconnect pattern 22 are covered with the resinous portion 24 and thus are waterproofed with certainty. Therefore, even in the liquid environment, electrical leakage or shorting does not take place, unlike in the prior art. Furthermore, damage or conductor breakage due to corrosion does not take place.

In addition, the external contacts 22a of the interconnect pattern 22 are formed at the other end of the elongated flexible substrate 20 brought out of the liquid W and so there is no possibility that the external contacts touch the liquid W. In addition, the interconnect pattern 22 extending from the points, where the connecting wires 23 are connected, to the external points 22a are sandwiched between the two insulating sheets 21 and covered. Consequently, the pattern is waterproofed with certainty. There is no danger that the pattern touches the liquid W.

In this way, the sensor 3 for observations in liquid environments is totally waterproofed. The sample S can be observed stably over a long time by making use of the self-detecting probe 2 without being affected by the liquid W at all.

The observation apparatus 1 of the present embodiment used for observations under liquid environments makes it possible to make observations in the liquid by utilizing the sensor 3 having the self-detecting probe 2, the sensor 3 being adapted for observation under liquid environments. Therefore, in the preparative stage prior to observation, alignment of the laser light which has been essential in the optical lever method is dispensed with. Accordingly, the apparatus is quite easy to use. The operability can be enhanced. Further, observations under liquid environments can be made quickly. Additionally, when the sensor 3 for observations under liquid environments is set or replaced, anyone can easily replace the sensor without wetting the external contacts 22a. Accordingly, the apparatus is easy for the user to handle. Excellent convenience is offered.

Second Embodiment

Figure 6:
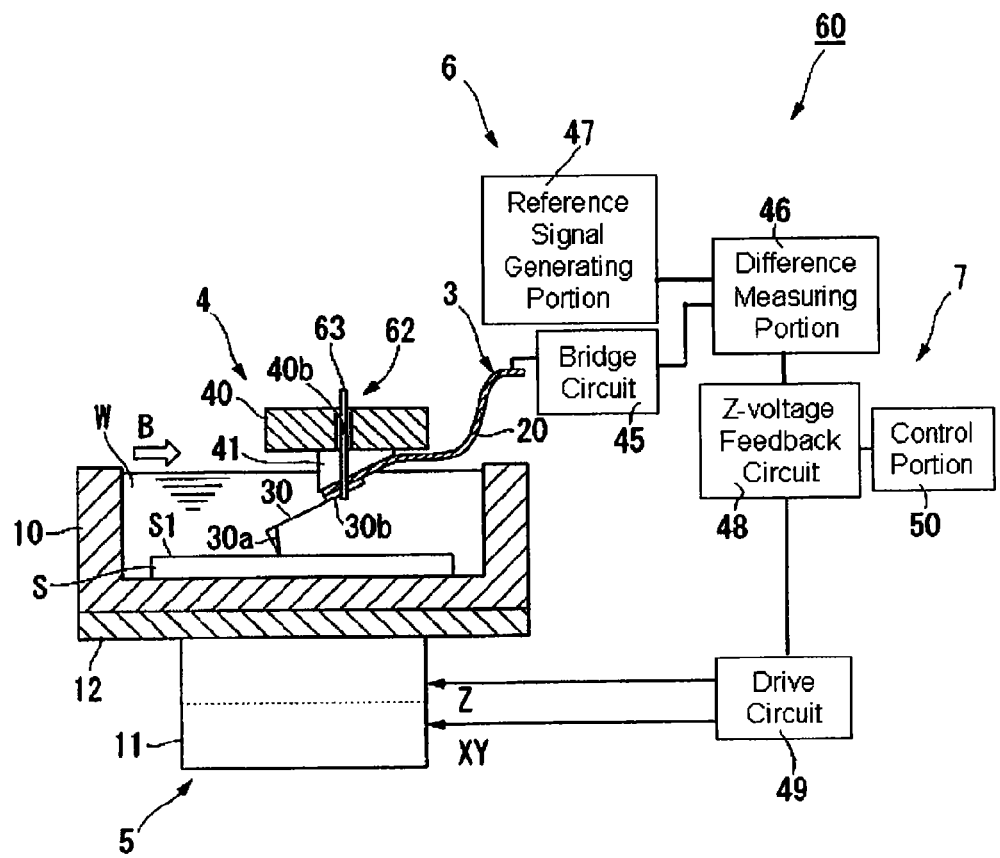
FIG. 6 is a block diagram of an observation apparatus used for observations under liquid environments, the apparatus showing a second embodiment associated with the present invention.
Figure 7:
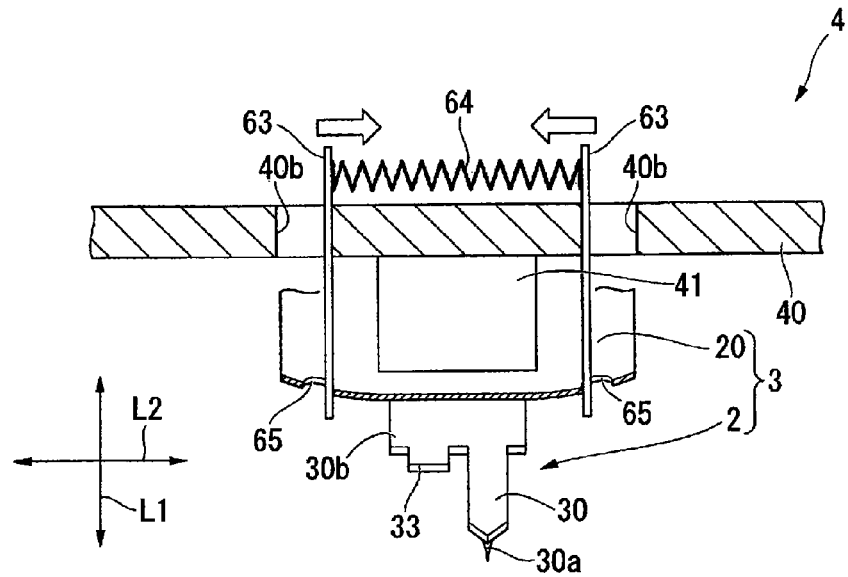
FIGS. 7(a) and (b) is a side elevation of the cantilever holder and observation sensor shown in FIG. 6, as viewed from the direction of the arrow B.
Figure 7:
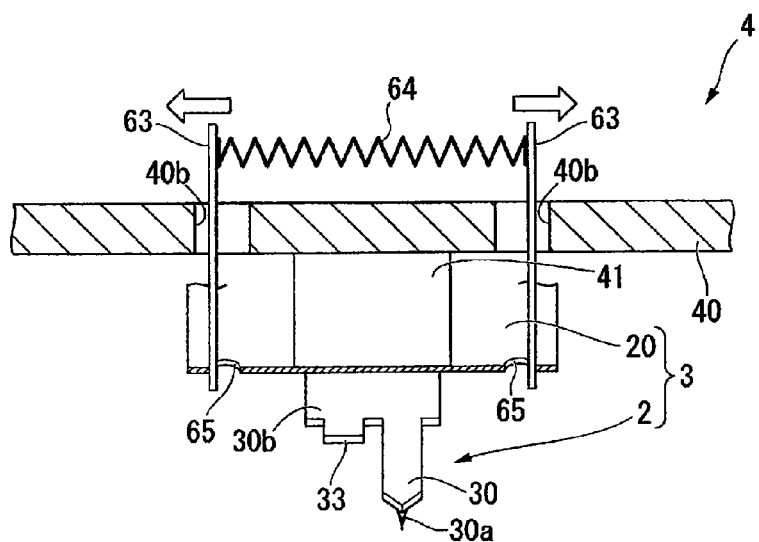
Figure 8:
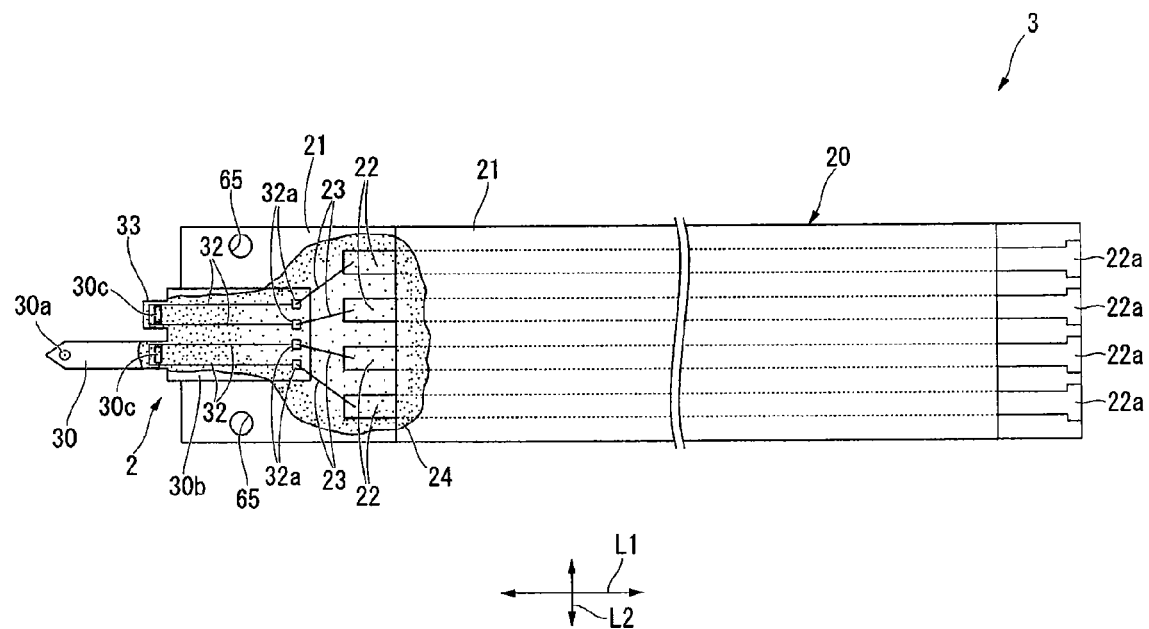
FIG. 8 is a top plan view of the sensor shown in FIG. 6, the sensor being used for observations under liquid environments.

A second embodiment associated with the present invention is next described by referring to FIGS. 6-8. In the second embodiment, those components which are identical with their counterparts of the first embodiment are indicated by the same reference numerals as in the first embodiment and their description will be omitted.

The difference between the second and first embodiments is as follows. In the first embodiment, the sensor 3 for observations under liquid environments is held using the wires 43. In the second embodiment, the sensor 3 is held using fixing pins 63.

An observation apparatus of the present embodiment is adapted for observations under liquid environments and generally indicated by reference numeral 60. As shown in FIG. 6, the apparatus 60 has a fixing mechanism 62 having the fixing pins 63 of one pair. As shown in FIGS. 7(a) and (b), the fixing pins 63 are inserted in slots 40b extending through the holder body 40. The pins 63 can move in the widthwise direction L2 substantially perpendicular to the longitudinal direction L1 of the flexible substrate 20 along the slots 40b. FIGS. 7(a) and (b) shows views of the cantilever holder 4 and self-detecting probe 2, as viewed from the direction of the arrow B in FIG. 6. In FIGS. 7(a) and (b), the openings 30c are omitted.

The length of the fixing pins 63 of one pair is so adjusted that one end of each pin protrudes below the obliquely faced block 41 and that the other end protrudes above the holder body 40. In the present embodiment, a biasing portion 64 as made of a coil spring is mounted between the fixing pins 63 of one pair to bias the pins 63 away from each other at all times.

As shown in FIG. 8, the sensor 3 of the present embodiment adapted for observations under liquid environments is provided with guide holes 65 extending through the substrate 20. The guide holes 65 are located near the opposite sides of the substrate 20. The guide holes 65 are so sized that the fixing pins 63 are inserted into the holes.

In the observation apparatus 60 of the present embodiment adapted for observations under liquid environments, when the sensor 3 for observations under liquid environments is set, a force is first applied to move the fixing pins 63 toward each other against the biasing force of the biasing portion 64 as shown in FIG. 7(a). The sensor 3 is placed on the obliquely faced block 41 of the cantilever holder 4 while the fixing pins 63 are inserted in the guide holes 65 formed in the flexible substrate 20. When the fixing pins 63 are inserted into the guide holes 65, the flexible substrate 20 is slightly curved.

Then, as shown in FIG. 7(b), the fixing pins 63 of one pair are biased away from each other by the biasing portion 64, thus moving the fixing pins 63. Consequently, the flexible substrate 20 is stretched within a plane. The substrate is held with certainty by the fixing pins 63 of one pair.

If the fixing mechanism 62 uses the fixing pins 63 in this way, the sensor 3 for observations in liquid environments can be held easily and in a short time. Especially, the sensor 3 can be held at a predetermined position with certainty because the fixing pins 63 are inserted into the guide holes 65. Consequently, accurate observations can be made in liquids in the same way as in the first embodiment.

Third Embodiment

A third embodiment associated with the present invention is next described by referring to FIGS. 9-12. In the third embodiment, those components which are identical with their counterparts of the first embodiment are indicated by the same reference numerals as in the first embodiment and their description will be omitted.

The differences between the third and first embodiments are as follows. In the first embodiment, the sensor 3 for observations in liquid environments is held by making use of the wires 43. In the third embodiment, the sensor 3 is held by utilizing fixing pins 73. In the first embodiment, the self-detecting probe 2 is supported to one end of the flexible substrate 20, while the external contacts 22a are formed on the other end. In the third embodiment, the self-detecting probe 2 is supported to around the center of the flexible substrate 20. The external connects 22a are formed at both ends.

Figure 9:
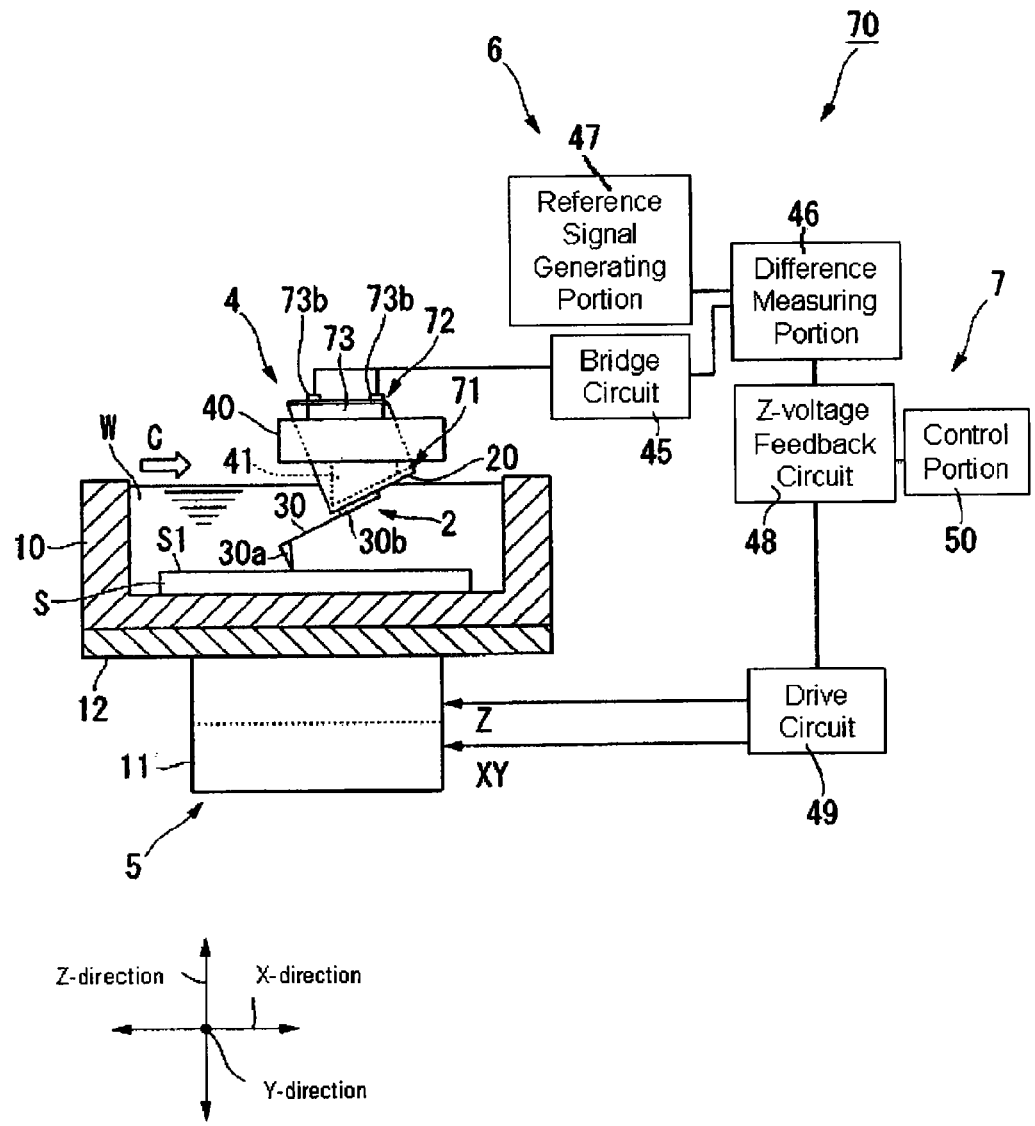
FIG. 9 is a block diagram of an observation apparatus used for observations under liquid environments, the apparatus showing a third embodiment associated with the present invention.

That is, an observation apparatus of the present embodiment adapted for observations in liquid environments is generally indicated by reference numeral 70. As shown in FIG. 9, the observation apparatus 70 has a sensor 71 for observations in liquids and a fixing mechanism 72 having a pair of fixing pins 73. The sensor 71 has the self-detecting probe 2 supported to around the center of the flexible substrate 20.

Figure 10:
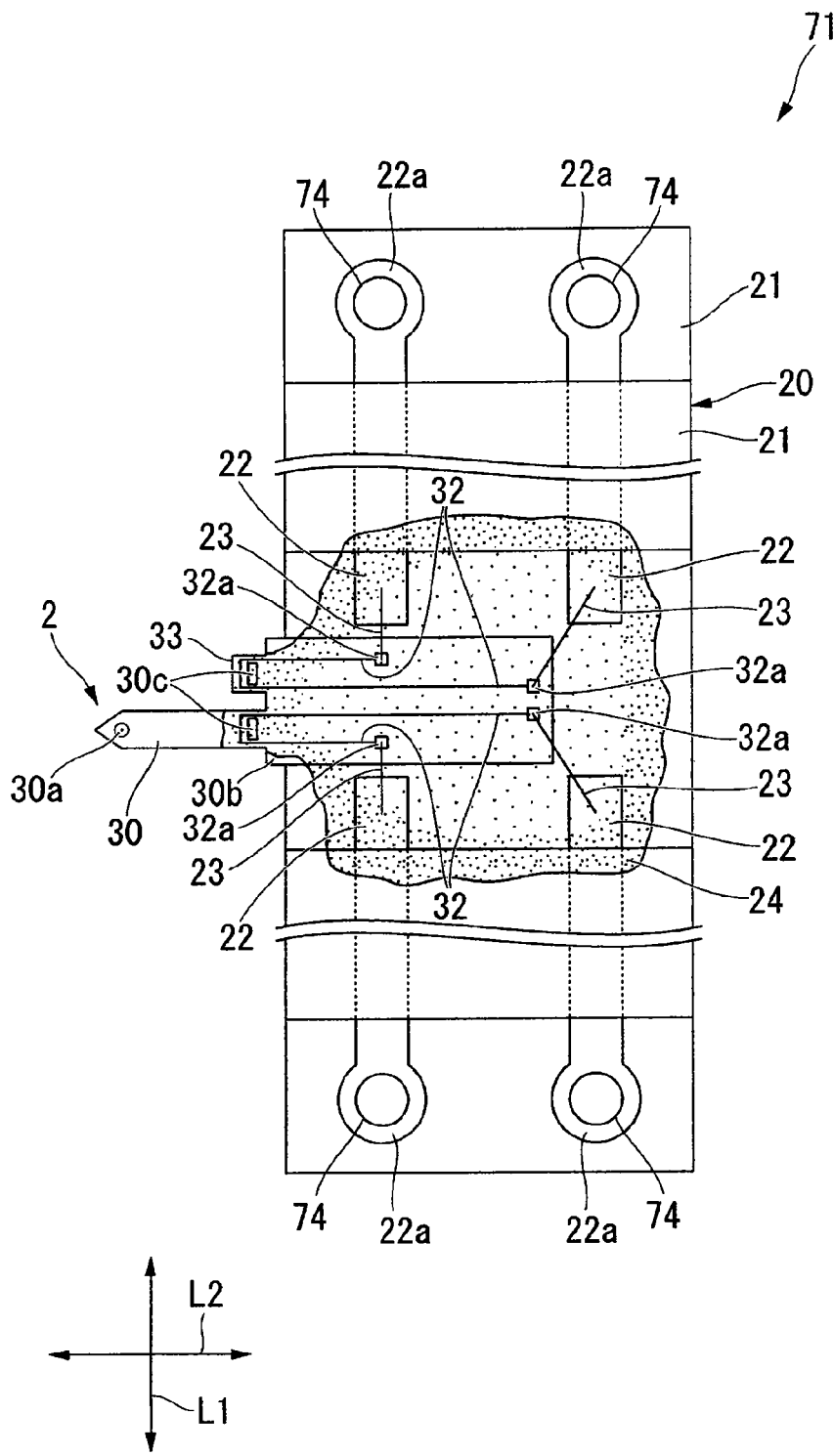
FIG. 10 is a top plan view of the sensor shown in FIG. 9, the sensor being used for observations under liquid environments.
Figure 11:
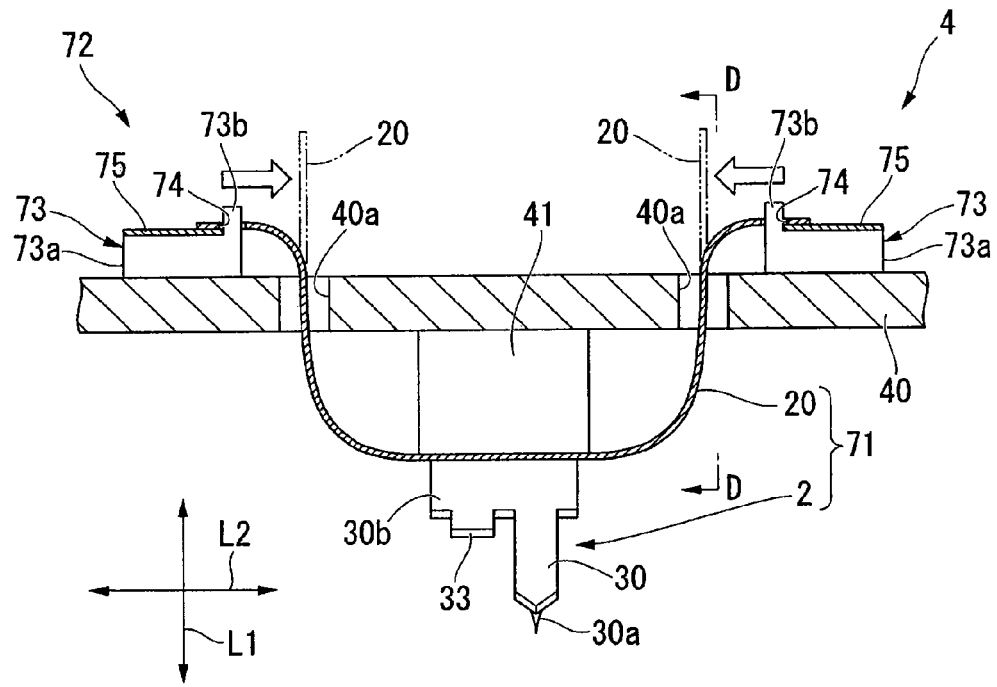
FIGS. 11(a) and (b) shows side elevations of the cantilever holder and observation sensor shown in FIG. 9, as viewed from the direction of the arrow C.
Figure 11:
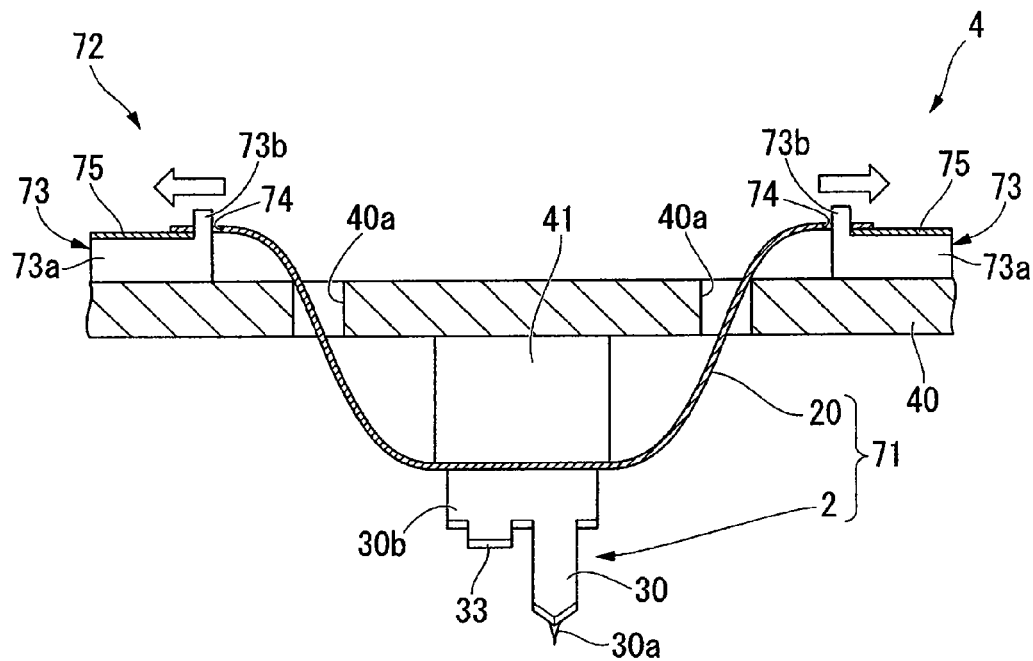

In the sensor 71 for observations under liquid environments, the self-detecting probe 2 is supported to around the center of the flexible substrate 20 such that the cantilever 30 extends in the widthwise direction L2 substantially perpendicular to the longitudinal direction L1 as shown in FIG. 10. In this structure, the cantilever 30 is supported such that it protrudes out of the flexible substrate 20. The interconnect pattern 22 extends close to the self-detecting probe 2 while parts of the pattern 22 are exposed around the center of the flexible substrate 20.

Connecting wires 23 are wire-bonded between the connector terminals 32a of the interconnects 32 and the interconnect pattern 22 in the same way as in the first embodiment. The interconnects 32, connecting wires 23, and the portions of the wires 23 electrically connected with the interconnect pattern 22 are coated with a resinous portion 24.

The interconnect pattern 22 of the present embodiment is exposed to the outside at both ends of the flexible substrate 20. The exposed portions form the external contacts 22a. Two guide holes 74 extending through their respective ones of the external contacts 22a are formed at one end of the flexible substrate 20. Additional two guide holes 74 extending through their respective ones of the external contacts 22a are formed at the other end of the substrate 20. That is, four guide holes 74 are formed. Consequently, the external contacts 22a are located around their respective guide holes 74.

The fixing pins 73 of one pair are held to the top surface of the holder body 40 so as to be movable toward and away from each other in the widthwise direction L2 of the flexible substrate 20 as shown in FIGS. 9 and 11(a) and (b). FIGS. 11(a) and (b) shows views of the cantilever holder 4 and the sensor 71 for observations under liquid environments, as viewed from the direction of the arrow C in FIG. 9, where the openings 30c are omitted.

Each fixing pin 73 is composed of a stationary base 73a and two pins 73b protruding upward from the stationary base 73a. The two pins 73b are spaced from each other by a distance substantially equal to the distance by which the adjacent two guide holes 74 formed in the flexible substrate 20 are spaced. Two pins 73b can be simultaneously inserted into the two guide holes 74 formed at each end of the flexible substrate 20.

An electrical contact 75 is formed on each stationary base 73a and electrically connected with the bridge circuit 45. The external contacts 22a of the flexible substrate 20 are automatically electrically connected with the electrical contacts 75 by inserting the pins 73b into the guide holes 74.

Holes 40a extending through the flexible substrate 20 are formed in the holder body 40. Thus, after placing the flexible substrate 20 across the obliquely faced block 41, the both ends of the flexible substrate 20 can be routed to the upper surface of the holder body 40 through the holes 40a.

Figure 12:
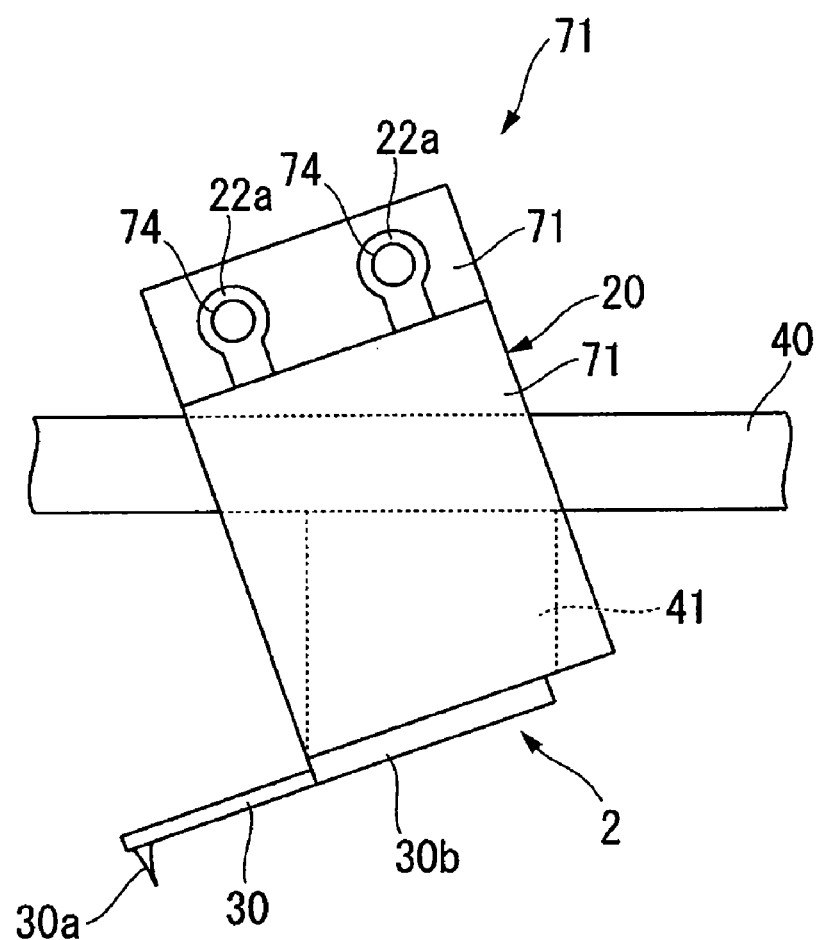
FIG. 12 is a view of the sensor shown in FIGS. 11(a) and (b) as viewed from the direction of the arrow D-D, the sensor being used for observations under liquid environments.

In the observation apparatus 70 of the present embodiment adapted for observations under liquid environments, when the sensor 71 for observations under liquid environments is set, the sensor 71 is first placed on the obliquely faced block 41 of the cantilever holder 4 under the condition where the fixing pins 73 of one pair have been brought close to each other as shown in FIG. 11(a). Both ends of the flexible substrate 20 are routed to the upper side of the holder body 40 through the holes 40a. As a result, the two guide holes 74 formed at the opposite ends of the flexible substrate 20 are placed on the upper surface of the holder body 40 as shown in FIG. 12. FIG. 12 is a view of the sensor 71 for observations in liquid environments, as viewed from the direction of the arrow D-D of FIG. 11(a).

Subsequently, as shown in FIG. 11(b), the two pins 73b of the fixing pins 73 are inserted into the two guide holes 74 formed at the opposite ends, respectively, of the flexible substrate 20. Both ends of the substrate 20 are caught to the fixing pins 73 of one pair.

At this time, the external contacts 22a formed around their respective through-holes 40a touch the electrical contacts 75 and so the external contacts 22a and 75 are electrically interconnected. That is, the bridge circuit 45 forming the detection mechanism 6 is electrically connected with the interconnect pattern 22.

Then, the fixing pins 73 of one pair are moved away from each other. Consequently, the flexible substrate 20 is stretched within a plane. Hence, the substrate is held with certainty by the fixing pins 73.

If the fixing mechanism 72 employs the fixing pins 73 in this way, the sensor 71 for observations under liquid environments can be held easily in a short time. Especially, the sensor 71 can be held reliably in a predetermined position because the pins 73b of the fixing pins 73 are inserted into the respective guide holes 74. In consequence, accurate measurements under liquid environments can be made in the same way as in the first embodiment.

In addition, at the instant when the flexible substrate 20 is caught on the fixing pins 73, the external contacts 22a come into contact with the electrical contacts 75 and so the external contacts 22a are electrically connected with the detection mechanism 6. That is, the external contacts 22a are automatically electrically connected with the detection mechanism 6 by performing an operation for setting the sensor 71 on the cantilever holder 4. Accordingly, preparative steps prior to observation can be performed quickly. The operability can be improved further.

In the third embodiment, the external contacts 22a are electrically connected with the detection mechanism 6 via the electrical contacts 75. The present invention is not limited to this method. For example, the fixing pins 73 themselves may be made of a conductive material. Also, in this case, the external contacts 22a can be electrically connected with the detection mechanism 6 at the instant when the flexible substrate 20 is caught on the fixing pins 73.

Fourth Embodiment

A fourth embodiment associated with the present invention is next described by referring to FIGS. 13-19. In the fourth embodiment, those components which are identical with their counterparts of the first embodiment are indicated by the same reference numerals as in the first embodiment and their description will be omitted.

The difference between the fourth and first embodiments is as follows. In the first embodiment, the self-detecting probe 2 is supported while the body portion 30b is placed on one insulating sheet 21 of the flexible substrate 20. In the fourth embodiment, the body portion 30b is supportively sandwiched between the two insulating sheets 21.

Figure 13:
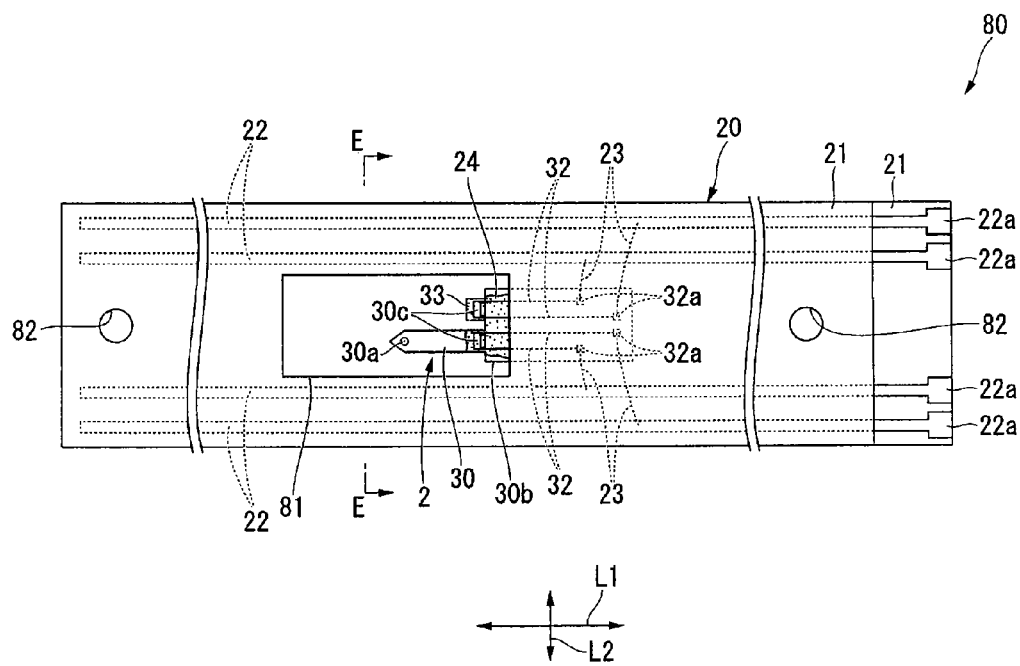
FIG. 13 is a top plan view of a sensor used for observations under liquid environments, the sensor showing a fourth embodiment associated with the present invention.
Figure 14:
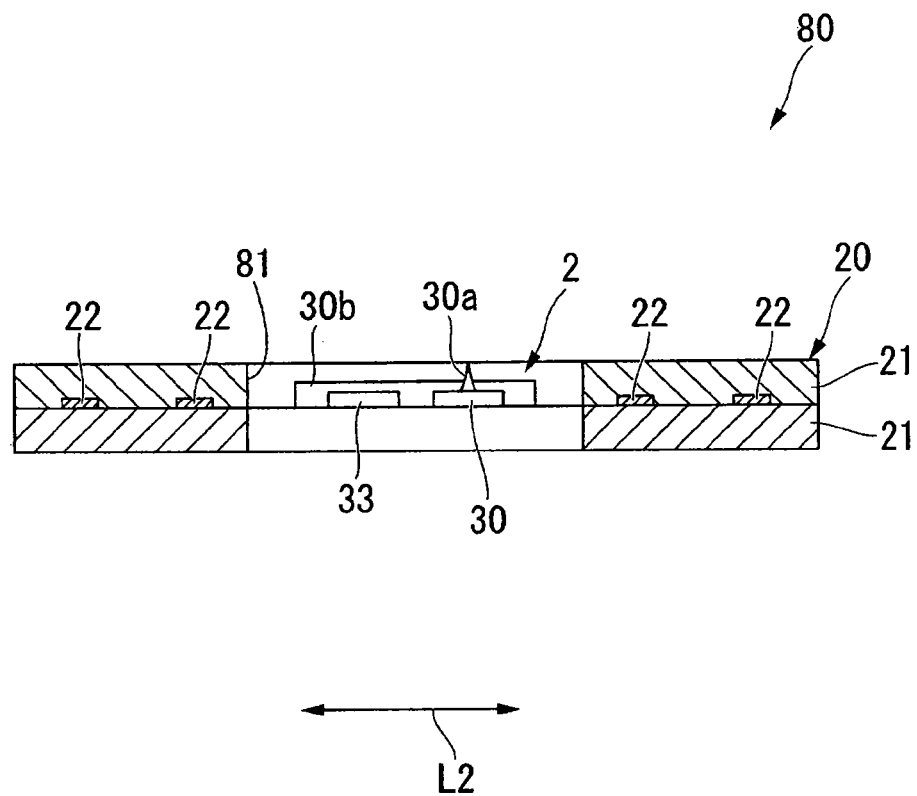
FIG. 14 is a view of the sensor shown in FIG. 13 as viewed from the direction of the arrow E-E, the sensor being used for observations under liquid environments.

That is, in a sensor 80 of the present embodiment adapted for observations in liquid environments, the self-detecting probe 2 is supported such that the body portion 30b is sandwiched between the two insulating sheets 21 of the flexible substrate 20 as shown in FIGS. 13 and 14. Consequently, parts of the interconnects 32, the connecting wires 23, and the portions of the connecting wires 23 electrically connected with the interconnect pattern 22 are protected by both insulating sheets 21 and thus are waterproofed more reliably. Accordingly, the sensor 80 of the present embodiment adapted for observations in liquid environments is less affected by the liquid W.

Furthermore, the flexible substrate 20 of the present embodiment is provided with rectangular through-holes 81. The self-detecting probe 2 is supported such that the cantilever 30 protrudes into the spaces formed by the through-holes 81. Therefore, when the flexible substrate 20 is flat, the cantilever 30 is nested within the thickness of the flexible substrate 20 as shown in FIG. 14. The cantilever does not protrude up or down from the surface of the flexible substrate 20. The probe tip 30a formed at the front end of the cantilever 30 does not protrude from the surface of the flexible substrate 20.

The probe tip 30a and cantilever 30 protrude from the surface of the flexible substrate 20 only when the flexible substrate 20 is curved.

Figure 15:
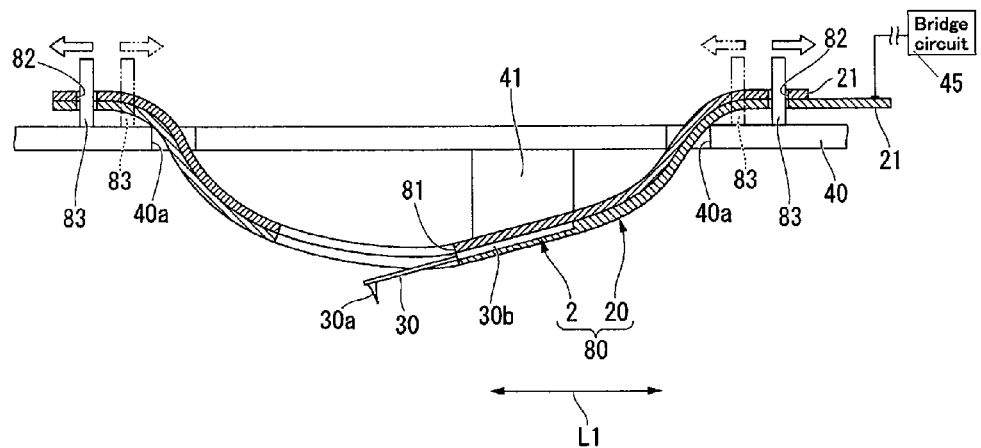
FIG. 15 is a view similar to FIG. 13, but in which the sensor for observations under liquid environments has been set on a cantilever holder.

Guide holes 82 into which fixing pins 83 (described later) are inserted are formed at opposite ends, respectively, of the flexible substrate 20. As shown in FIG. 15, the fixing pins 83 of one pair capable of moving toward and away from each other in the longitudinal direction L1 of the flexible substrate 20 are mounted on the top surface of the holder body 40.

Holes 40a extending through the flexible substrate 20 are formed in the holder body 40. After placing the flexible substrate 20 across the obliquely faced block 41, both ends of the flexible substrate 20 can be routed to the top surface of the holder body 40 through the holes 40a.

When the sensor 80 of the present embodiment adapted for observations in liquid environments is set, the sensor 80 is placed on the obliquely faced block 41 of the cantilever holder 4 after the fixing pins 83 of one pair have been brought close to each other. Both ends of the flexible substrate 20 are routed to the top surface of the holder body 40 through the holes 40a. Subsequently, the fixing pins 83 are inserted into the guide holes 82 formed at the opposite ends of the flexible substrate 20 and are caught there. Then, the fixing pins 83 of one pair are moved away from each other. Consequently, the flexible substrate 20 is stretched within a plane. As a result, the substrate 20 is held reliably by the pair of fixing pins 83.

Especially, in the case of the present embodiment, when the sensor 80 for observations in liquid environments is set on the obliquely faced block 41 and both ends of the flexible substrate 20 are routed to the top surface of the holder body 40 through the holes 40a, the flexible substrate 20 is curved. At this time, the cantilever 30 and probe tip 30a protrude from the surface of the flexible substrate 20 as shown in FIG. 15. Therefore, the cantilever 30 and probe tip 30a can be protected until the sensor 80 is set. Consequently, prior to observation, the possibility that the cantilever 30 (especially, the probe tip 30a) is damaged can be reduced.

In this way, in the sensor 80 of the present embodiment adapted for observations in liquid environments, the body portion 30b is protected by the both insulating sheets 21 and so the sensor is waterproofed more reliably. Observations in liquid environments can be made while less affected by the liquid W. Furthermore, prior to observations, it is less likely that the cantilever 30 and probe tip 30a are damaged. In addition, the cantilever 30 can be checked from above through the through-holes 81. Therefore, during observations under liquid environments, an optical microscope can be used in conjunction.

Figure 16:
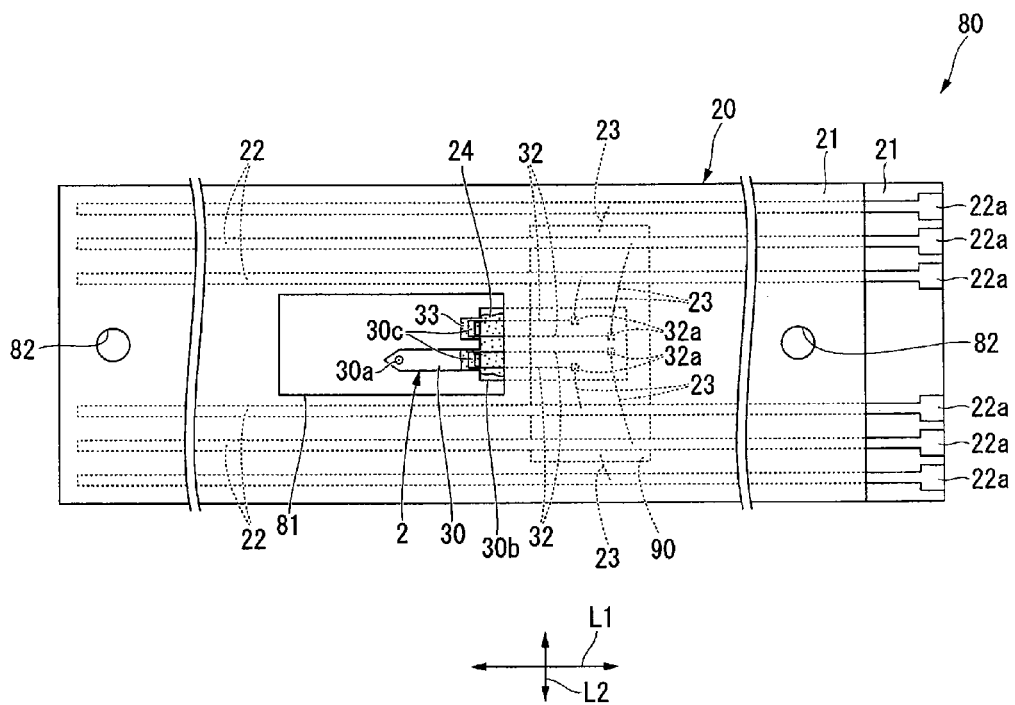
FIG. 16 is a top plan view of a sensor used for observations under liquid environments and including a vibration source between its body portion and insulating sheets, showing a modification of the sensor shown in FIG. 13.
Figure 17:
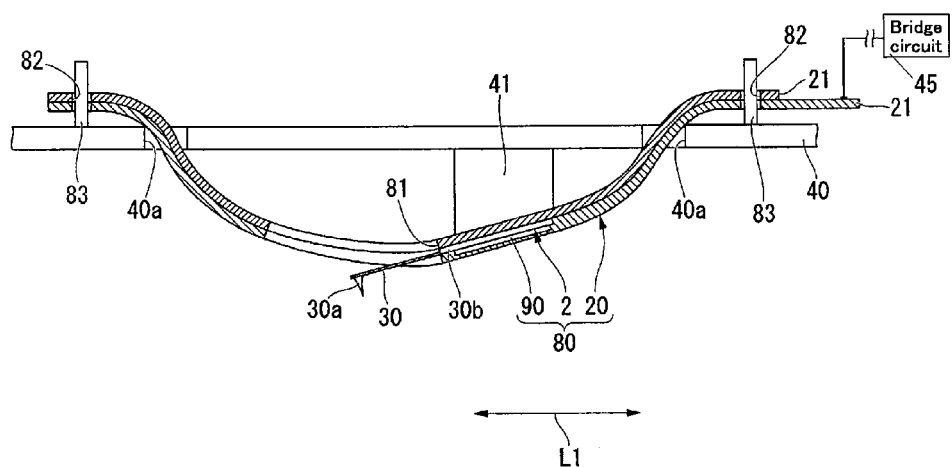
FIG. 17 is a view of the sensor shown in FIG. 16 and adapted for observations under liquid environments, and in which the sensor has been set on the cantilever holder.

In the fourth embodiment, a vibration source 90 for vibrating the cantilever 30 with given phase and amplitude may be mounted between the insulating sheets 21 and the body portion 30b under the condition where the vibration source is electrically connected with the interconnect pattern 22 via the connecting wires 23 as shown in FIGS. 16 and 17. The vibration source 90 is a device vibrating with phase and amplitude corresponding to a waveform signal sent in from the outside via the external contacts 22a. The cantilever 30 vibrates with amplitude and phase delay corresponding to the waveform signal because of transmission of the vibrations. Therefore, in this case, observations under liquid environments can be made in a vibrational mode where the cantilever 30 is vibrated. Various kinds of data about the observed sample S can be acquired. As a consequence, more multifaceted observations under liquid environments can be made.

Especially, the vibration source 90 can be brought into direct contact with the body portion 30b. Therefore, the vibrations of the vibration source 90 can be directly transmitted to the body portion 30b such that vibrations of the other components are suppressed to a minimum. Accordingly, only the cantilever 30 can be vibrated only under desired state. The accuracy at which observations are made under liquid environments can be enhanced. Furthermore, the vibration source 90 are protected by the both insulating sheets 21 of the flexible substrate 20 and thus are waterproofed. For this reason, the vibration source 90 is not affected by the liquid W at all.

Where observations are made in a vibrational mode, scanning is done while controlling the distance between the probe tip 30a and the sample S such that the state of vibration of the cantilever 30 (e.g., the amplitude of the vibrations or the frequency when self-oscillation is induced) is kept constant.

Figure 18:
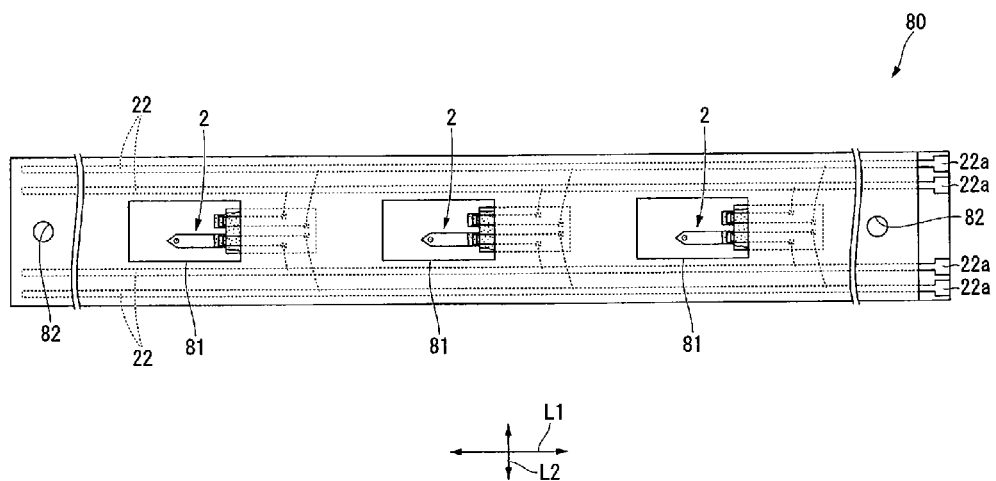
FIG. 18 is a top plan view of a sensor used for observations under liquid environments and including plural self-detecting probes arranged longitudinally, showing a modification of the sensor shown in FIG. 13.
Figure 19:
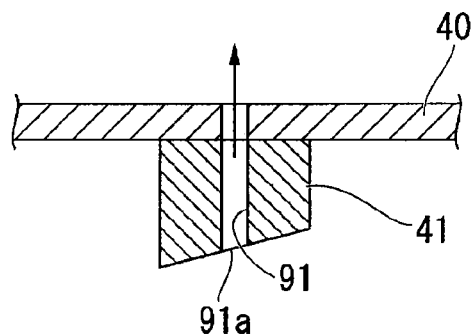
FIG. 19 is a cross-sectional view of a fixing mechanism having suction passages opening into an obliquely faced block, showing a modification of the fixing mechanism associated with the present invention.
Figure 20:
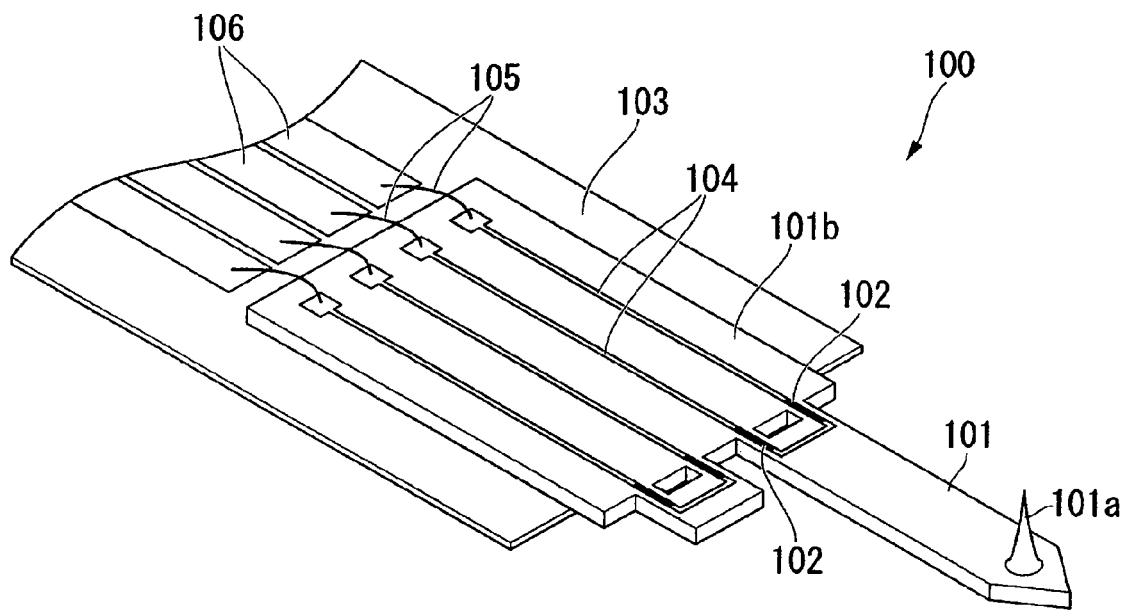
FIG. 20 is a perspective view of one conventional self-detecting probe.
Figure 21:
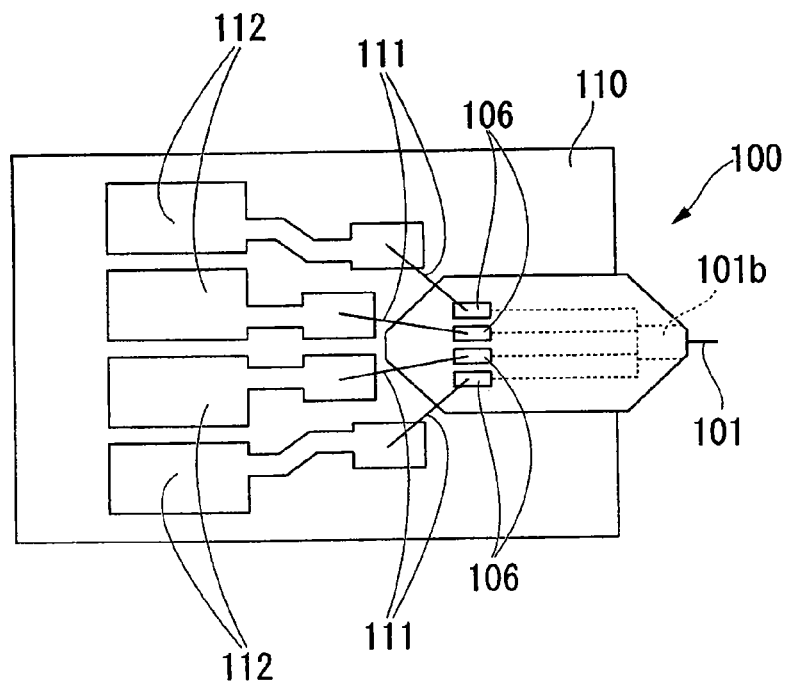
FIG. 21 is a top plan view of the conventional self-detecting probe, and in which the probe has been mounted on a substrate.
Figure 22:
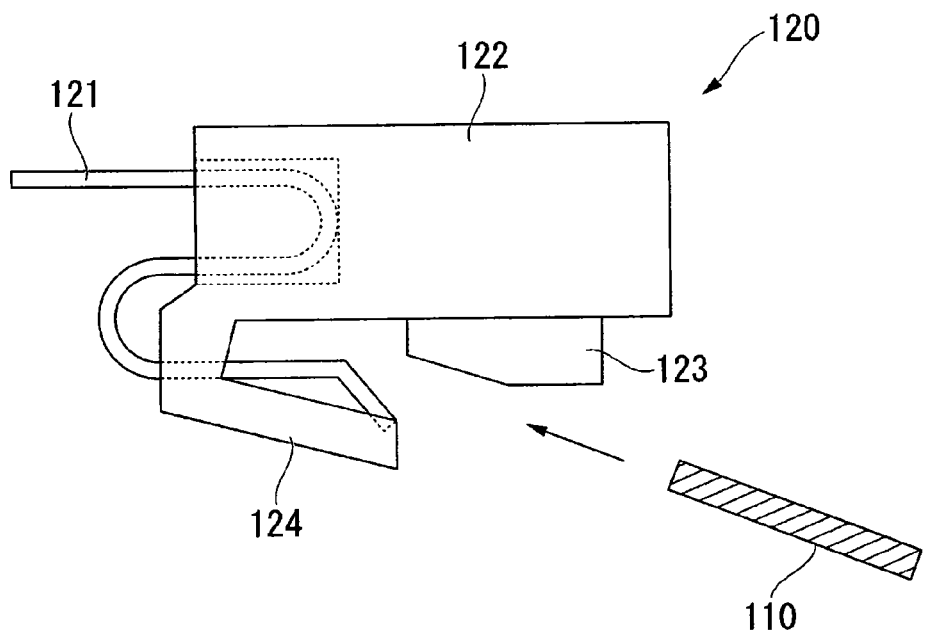
FIG. 22 is a side elevation of a cantilever holder for holding the substrate shown in FIG. 21.

In the fourth embodiment, the plural through-holes 81 may be formed at regular intervals in the longitudinal direction L1 of the flexible substrate 20 as shown in FIG. 18. The sensor 80 for observations under liquid environments may have plural self-detecting probes 2 whose number matches the number of the through-holes 81. In this case, the self-detecting probes 2 can be replaced easily in a short time simply by shifting the flexible substrate 20 in the longitudinal direction L1. Therefore, labor in replacing them can be reduced to a minimum. Observations in liquid environments can be carried out efficiently.

Where this sensor 80 for observations under liquid environments is held, suction passages 91 in communication with openings 91a formed in the obliquely faced block 41 of the cantilever holder 4 may be formed as shown in FIG. 19. The sensor 80 can be attracted and held via the suction passages 91. In this structure, the sensor 80 can be attracted and held to the cantilever holder 4 by a simple method using an attractive force. Hence, the replacing work can be done in a shorter time.

The adoption of the suction passages 91 is not limited to the fourth embodiment. The suction passages may also be employed in the first through third embodiments. In any embodiment, the sensor for observations in liquid environments can be held in a shorter time easily.

It is to be understood that the technical scope of the present invention is not limited to the above-described embodiments and that various changes and modification can be made thereto without departing from the gist of the present invention.

For example, in the above embodiments, an example is given in which the sample is scanned (i.e., moved) in three dimensions. The invention is not limited to this sample scanning method. A probe scanning method in which a self-detecting probe is moved in three dimensions may also be adopted. Also, in this case, advantages similar to the advantages of the sample scanning method can be had; only the scanning method is different. Both sample and self-detecting probe may be designed to be movable in three dimensions.

What is claimed is:

1. A sensor for observing a sample in a liquid, comprising:
a self-detecting probe having a probe tip located at its front end and placed opposite to the sample to be observed, a cantilever having a base end supported to a body portion of the probe, a strain resistive element formed over the cantilever and having a resistance value varying according to an amount of displacement of the cantilever, and interconnects electrically connected with the strain resistive element and extending from the cantilever to over the body portion;
an elongated, belt-like flexible substrate having an interconnect pattern sealed between two insulating sheets, the flexible substrate supporting the body portion while the cantilever protrudes outwardly, the flexible substrate having at least one end brought out of the liquid, the flexible substrate having external contacts exposed to the outside at said one end brought out of the liquid;
connecting members electrically connecting said interconnects with said interconnect pattern; and
an insulating resinous portion with which said interconnects, said connecting members, and portions of the connecting members electrically connected with the interconnect pattern are coated.

2. A sensor as set forth in claim 1, wherein said self-detecting probe is supported such that said body portion is sandwiched between said insulating sheets.

3. A sensor as set forth in claim 2,
wherein said flexible substrate is provided with through-holes;
wherein said self-detecting probe is so supported that said cantilever protrudes into spaces formed by said through-holes;
wherein when said flexible substrate is flat, the cantilever is nested within thickness of the substrate; and
wherein when said flexible substrate is curved, the cantilever protrudes from a surface of the substrate.

4. A sensor as set forth in claim 3, wherein said through-holes formed in the flexible substrate are regularly spaced from each other longitudinally of the substrate, and wherein said self-detecting probe is mounted in each of the through-holes.

5. A sensor as set forth in claim 2, wherein a vibration source for vibrating said cantilever with given phase and amplitude while the vibration source is electrically connected with said interconnect pattern is mounted between said insulating sheets and said body portion.

6. An observation apparatus adapted for observations under liquid environments, said observation apparatus comprising:
a sensor adapted for observations in liquid environments as set forth in claim 1;
a cantilever holder which has a fixing mechanism for detachably holding the sensor and which, when the sensor is set, places said probe tip opposite to the sample;
a moving mechanism for scanning the probe tip and the sample relative to each other in a direction parallel to a surface of the sample and for moving the probe tip and the sample relative to each other in a direction perpendicular to the surface of the sample;
a detection mechanism for detecting a value of an electrical current flowing through said interconnects via said external contacts to detect an amount of displacement of the cantilever; and
an observation mechanism for observing the sample by controlling the moving mechanism to control the distance between the probe tip and the surface of the sample during the scanning such that the amount of displacement of the cantilever or an amount of amplitude is kept constant.

7. An observation apparatus as set forth in claim 6,
wherein said fixing mechanism has wires extending in a widthwise direction substantially perpendicular to a longitudinal direction of said flexible substrate;
wherein said sensor for observations under liquid environments is pushed down on said cantilever holder and held using the wires and is released by loosening the wires; and
wherein notches into which the wires enter to place the wires in position are formed on opposite sides of said flexible substrate.

8. An observation apparatus as set forth in claim 6,
wherein said flexible substrate is provided with guide holes extending through the substrate;
wherein said fixing mechanism has fixing pins of one pair which can be moved toward and away from each other and which are inserted into said guide holes; and
wherein a tensile force is applied across said flexible substrate by moving the fixing pins away from each other, thus holding the sensor.

9. An observation apparatus as set forth in claim 8,
wherein said guide holes extend through said external contacts and are formed at ends of said flexible substrate; and
wherein said detection mechanism and said external contacts are automatically electrically interconnected by inserting said fixing pins into the guide holes.

10. An observation apparatus as set forth in claim 6, wherein said fixing mechanism has suction passages in communication with openings formed in said cantilever holder, and wherein said sensor is attracted and held via the suction passages.

* * * * *